US006973187B2

(12) United States Patent
Gligor et al.

(10) Patent No.: US 6,973,187 B2
(45) Date of Patent: Dec. 6, 2005

(54) BLOCK ENCRYPTION METHOD AND SCHEMES FOR DATA CONFIDENTIALITY AND INTEGRITY PROTECTION

(75) Inventors: Virgil Dorin Gligor, Chevy Chase, MD (US); Pompiliu Donescu, Gaithersburg, MD (US)

(73) Assignee: VDG, Inc., Chevy Chase, MD (US)

( * ) Notice: Subject to any disclaimer, the term of this patent is extended or adjusted under 35 U.S.C. 154(b) by 1011 days.

(21) Appl. No.: 09/761,771

(22) Filed: Jan. 18, 2001

(65) Prior Publication Data

US 2001/0033656 A1 Oct. 25, 2001

Related U.S. Application Data

(60) Provisional application No. 60/179,147, filed on Jan. 31, 2000.

(51) Int. Cl.[7] .............................................. H04L 9/06
(52) U.S. Cl. ............................ 380/28; 380/37; 380/43; 380/44; 380/46; 713/170
(58) Field of Search ........................... 380/4, 9, 25, 23, 380/28–29, 37, 43, 44, 46, 50; 713/170

(56) References Cited

U.S. PATENT DOCUMENTS 6,226,742 B1 * 5/2001 Jakubowski et al. ........ 713/170
6,333,983 B1 * 12/2001 Enichen et al. ............. 380/273

OTHER PUBLICATIONS

A.J. Menezes et al, "Hash Functions and Data Integrity", Handbook of Applied Crytography, Chp 7, pp 223-282; Chp 9, pp 321-383, 1997; CRC Press, Boca Raton.
Gligor et al, "Object Migration and Authentication", IEEE Transactions on Software Engineering SE-5, vol. 5, pp. 607-611, 1979, IEEE.
NBS FIPS pub 46, titled "Data Encryption Standard", National Bureau of Standards, U.S. Dept of Commerce Jan. 1977, pp. 1-18.
NBS FIPS Pub 81, Titled "DES Modes of Operation", National Bureau of Standards, U.S. Dept of Commerce pp. 1-17, Dec. 1980.
Meyer et al, Cryptography; A New Dimension in Computer Data Security, A Guide For The Design and Implementation of Secure Systems, pp. 69-71, 1982, John Wiley & Sons, 2nd printing.
Bellare et al. "A Concrete Security Treatment of Symmetric Encryption", Proceedings of the 38th Symposium on Foundations of Computer Science, IEEE, 1997, pp. 394-403.

(Continued)

*Primary Examiner*—Gregory Morse
*Assistant Examiner*—Tongoc Tran
(74) *Attorney, Agent, or Firm*—Foley & Lardner LLP

(57) ABSTRACT

A block encryption method and schemes (modes of operation) that provide both data confidentiality and integrity with a single cryptographic primitive and a single processing pass over the input plaintext string by using a non-cryptographic Manipulation Detection Code function for secure data communication over insecure channels and for secure data storage on insecure media. The present invention allows, in a further aspect, software and hardware implementations, and use in high-performance and low-power applications, and low-power, low-cost hardware devices. The block encryption method and schemes of this invention allow, in yet a further aspect, encryption and decryption in parallel or pipelined manners in addition to sequential operation. In a yet further aspect, the block encryption method and schemes of this invention are suitable for real-time applications.

82 Claims, 14 Drawing Sheets

OTHER PUBLICATIONS

C.M. Campbell, "Design and Specification of Cryptographic Capabilities", in Computer Science And The Data Encryption Standard, (D.K. Brandstad (ed.) National Bureau of Standards Special Publications 500-527 U. S. Dept of Commerce, Feb. 1978, pp. 54-66.

Naor et al, "From Unpredictability to Indistinguishability: A Simple Construction of Pseudo-Random Functions From MACs", in Advances in Cryptolog—CRYPTO '98 (LNCS 1462), pp. 267-282, 1998, Springer-Verlag.

Goldwasser et al, "Lecture Notes on Cryptography", 1999, Available at http://www.cse.ucsd.edu/users/mihir/papers/gb.pdf.

Kohl et al, RFC 1510, The Kerberos Network Authentication Service (V5), Internet Request For Comments 1510.

Petrank et al, CBC MAC for Real-Time Data Sources:, Manuscript Available at http://www.cs.technion.ac.il/~erez/publications.html, 1999.

Jueneman et al, "Message Authentication with Manipulation Detection Codes", Proc. Of the IEEE Symp on Security and Privacy, Oakland, CA, pp. 33-54, 1983, IEEE Computer Society.

Stubblebine et al, "On Message Integrity in Cryptographic Protocols", Proceedings of the 1992 IEEE Computer Society Symposium on Research in Security and Privacy, pp. 85-104, 1992, IEEE Computer Society Press.

Kohl et al, "The use of Encryption in Kerberos for Network Authentication", Advances in Cryptology-CRYPTO 1989, (LNCS 435), pp. 35-43, 1990, Digital Equip. Corp.

D. E. Knuth, "The Art of Computer Programming—Vol. 2: Seminumerical Algorithms", 1981, ($2^{nd}$ ed.) Chapter 3, pp. 1-110, Addison Wesley.

Gligor Virgil D. and Donescu Pompiliu. "Fast Encryption and Authentication: XCBC Encryption and XECB Authentication Modes." VDG Inc. Oct. 27, 2000. pp. 1-30, <http://citeseer.nj.nec.com/cs>.

Rogaway, Phillip. "Comments to NIST Concerning AES Modes of Operation: PMAC: A Parallelizable Message Authentication Code." Univ. of CA at Davis and Chiang Mai Univ. Thailand. Oct. 16, 2000. pp. 1-6. http://citeseer.nj.nec.com/cs.

Proceedings IEEE Symposium on Security and Privacy. Jueneman, R.R., Matyas, S.M., and Meyer, C.H. "Message Authentication with Manipulation Detection Codes." pp. 33-54. Apr. 25, 1983.

* cited by examiner

BLOCK ENCRYPTION METHOD AND SCHEMES FOR DATA CONFIDENTIALITY AND INTEGRITY PROTECTION

CROSS-REFERENCE TO RELATED APPLICATION(S)

This application claims the benefit of priority under 35 U.S.C. §119(e) of provisional application Ser. No. 60/179,147 entitled "XCBC Encryption Schemes," filed on Jan. 31, 2000, the disclosure of which is incorporated herein in its entirety.

FIELD OF THE INVENTION

The present invention relates to the technical field of secure data communication over insecure channels and secure data storage on insecure media using data encryption techniques. Specifically, the invention relates to encryption methods, program products and systems that achieve both data confidentiality and integrity in a single pass over the data with a single cryptographic primitive and allow encryption and decryption in sequential, parallel or pipelined manners.

BACKGROUND OF THE INVENTION

It is generally accepted that whenever two or more parties want to communicate over an insecure channel, encryption with a shared secret key can effectively hide all information about the message contents thereby providing data confidentiality (secrecy). However, an insecure channel allows a third party (i.e., an adversary) to modify the other parties' encrypted messages and insert encrypted messages of their own into the insecure channel, not just to read and analyze the other parties' encrypted messages. Furthermore, message encryption cannot provide the ability of each of the two communicating parties to determine that a message received was, in fact, generated by the other party. That is, message encryption, by itself, does not guarantee the integrity (authenticity) of the message data. For example, an adversary can alter the ciphertext of the encrypted message (sections deleted, rearranged, added to, etc.) after it is generated, transmitted via, or stored in, the insecure channel in a way that may cause undetectable message-plaintext alteration at decryption by the recipient (viz., A. J. Menezes, P. C. van Oorschot, and S. A. Vanstone: "Handbook of Applied Cryptography", CRC Press, Boca Raton, 1997). Therefore, it is desirable that encryption methods provide data integrity in addition to data confidentiality for communication over insecure channels. Such methods are also desirable whenever a party stores a set of data on an insecure storage device that can be accessed by other parties which are not intended to read or alter that data (viz., V. D. Gligor and B. G. Lindsay: "Object Migration and Authentication," IEEE Transactions on Software Engineering, SE-5 Vol. 6, November 1979).

Block ciphers have long been established among the cryptographic primitives of choice for implementing general data encryption. A block cipher uses a key to transform data (plaintext) blocks of fixed length into ciphertext blocks of the same length. To encrypt data consisting of multiple blocks, encryption schemes, also known as encryption modes to those skilled in the art, typically use block ciphers. A well-known block cipher is provided by the U.S. Data Encryption Standard (DES), which uses a 56-bit key and has a block size of 64 bits (viz., NBS FIPS Pub 46, titled "Data Encryption Standard," National Bureau of Standards, U.S. Department of Commerce, January 1977). DES can be used with different modes (or schemes) of operation to process multi-block data (viz., NBS FIPS Pub 81, titled "DES Modes of Operation", National Bureau of Standards, U.S. Department of Commerce, December 1980), of which the most used one is the Cipher Block Chaining (CBC) mode. It is well-known in the art that the CBC mode of encryption can use other block cipher algorithms, not just that of DES.

CBC takes as input data a plaintext string $x=x_1 \ldots x_n$, an initialization vector, IV, and a key K. The size of each block $x_i$ and of the IV is l bits and that of key K is k bits (e.g., l=64 and k=56 in DES). The encryption of plaintext x is denoted by ciphertext $z=z_1 \ldots z_n$, and is defined by equation $z_i = F_K(x_i \oplus z_{i-1})$, where $i=1, \ldots, n$, $z_0=IV$, $\oplus$ is the bit-wise exclusive-or operation, and $F_K$ is the block cipher F using key K. Key K is usually chosen uniformly at random. Decryption of ciphertext $z=z_1 \ldots z_n$ is performed by $F^{-1}_K$, the inverse of the block cipher F using key K, to obtain plaintext $x=x_1 \ldots x_n$, and is defined by equation $x_i = F^{-1}_K(z_i) \oplus z_{i-1}$, where $i=1, \ldots, n$, $z_0=IV$.

Also well-known in the art are other encryption schemes, such as the Plaintext-Ciphertext Block Chaining (PCBC) (viz., C. H. Meyer and S. M. Matyas: "Cryptography; A New Dimension in Computer Data Security", John Wiley & Sons, New York, 1982 (second printing)), stateful or counter-based (XORC), and stateless (XOR$), XOR schemes (viz., M. Bellare, A. Desai, E. Jokipii, and P. Rogaway: "A Concrete Security Treatment of Symmetric Encryption," Proceedings of the 38th Symposium on Foundations of Computer Science, IEEE, 1997, pp. 394–403), and the "infinite garble extension" (viz., C. M. Campbell: "Design and Specification of Cryptographic Capabilities," in Computer Security and the Data Encryption Standard, (D. K. Brandstad (ed.)) National Bureau of Standards Special Publications 500–27, U.S. Department of Commerce, February 1978, pp. 54–66). The encryption and decryption equations of these schemes illustrate in a brief manner how these schemes use $F_K$, a block cipher F with key K, and its inverse $F^{-1}_K$, to process the plaintext and ciphertext blocks of a message or data. For example, in the PCBC scheme, encryption of plaintext string $x=x_1 \ldots x_n$ to obtain ciphertext string $z=z_1 \ldots z_n$ is defined by the following equation:

$$z_i = F_K(x_i \oplus z_{i-1} \oplus x_{i-1}), x_0=IV_1, z_0=IV_2, i=1, \ldots, n$$

where $F_K$ is the block cipher F using secret key K. In this scheme, decryption of ciphertext string $z=z_1 \ldots z_n$ to obtain plaintext string $x=x_1 \ldots x_n$, is defined by the following equation:

$$x_i = F^{-1}_K(z_i) \oplus z_{i-1} \oplus x_{i-1}, x_0=IV_1, z_0=IV_2, i=1, \ldots, n$$

where and $F^{-1}_K$ is the inverse of the block cipher F using secret key K.

In the "infinite garble extension" scheme, encryption of plaintext string $x=x_1 \ldots x_n$ to obtain ciphertext string $z=z_1 \ldots z_n$, is defined by the following equation:

$$z_i = F_K(x_i \oplus z_{i-1}) \oplus x_{i-1}, x_0=IV_1, z_0=IV_2, i=1, \ldots, n,$$

where $F_K$ is the block cipher F using key K. In this scheme, decryption of ciphertext string $z=z_1 \ldots z_n$ to obtain plain text string $x=x_1 \ldots x_n$, is defined by the following equation:

$$x_i = F^{-1}_K(z_i \oplus x_{i-1}) \oplus z_{i-1}, x_0=IV_1, z_0=IV_2, i=1, \ldots, n,$$

where $F^{-1}{}_K$ is the inverse of block cipher F using secret key K.

The encryption and decryption equations of the stateful XOR (XORC) scheme use a counter, ctr, which is initialized to constant value c. Encryption of plaintext string $x=x_1 \ldots x_n$ to obtain ciphertext string $z=z_1 \ldots z_n$ with the XORC scheme is defined by the following equation:

$$z_i = F_K(\text{ctr}+i) \oplus x_i, \quad i=1, \ldots, n,$$

where new counter value ctr+n is obtained after each message x encryption, n is the number of blocks of message x, and $F_K$ is the block cipher F using key K. In this scheme, decryption of ciphertext string $z=z_1 \ldots z_n$ to obtain plain text string $x=x_1 \ldots x_n$, is defined by the following equation:

$$x_i = F_K(\text{ctr}+i) \oplus z_i, \quad i=1, \ldots, n.$$

In contrast with the CBC, PCBC, and "infinite garble extension" schemes, in both the stateful XOR (XORC) scheme and stateless XOR (XOR$) scheme, blocks $x_i$ of plaintext x and blocks $z_i$ of ciphertext z are not processed by $F_K$ and $F^{-1}{}_K$. Nevertheless in these schemes, just as in all others, the message or data decryption operation is the inverse of the message or data encryption operation.

It is well-known in the art that only certain encryption schemes are secure with respect to confidentiality (secrecy) when chosen-plaintext attacks are launched by an adversary using a well-defined set of resources (viz., M. Bellare, A. Desai, E. Jokipii, and P. Rogaway: "A Concrete Security Treatment of Symmetric Encryption," Proceedings of the 38th Symposium on Foundations of Computer Science, IEEE, 1997, pp. 394–403). In such attacks, an adversary can obtain ciphertexts for a set of plaintexts of his/her own choice. Security with respect to confidentiality (secrecy) means that, after such an attack, the adversary cannot determine the plaintext of a never-seen-before ciphertext message (i.e., a ciphertext message not obtained during the attack) with more than negligible probability. The notion of negligible probability in such attacks is also known to those skilled in the art (e.g., as defined by M. Naor and O. Reingold: "From Unpredictability to Indistinguishability: A Simple Construction of Pseudo-Random Functions from MACs," in Advances in Cryptology—CRYPTO '98 (LNCS 1462), pp. 267–282, 1998). All schemes that are secure in this sense are called "confidentiality-secure against chosen-plaintext attacks," or simply, "confidentiality-secure," henceforth.

Variants of the CBC and XOR schemes are proved to be confidentiality-secure against chosen-plaintext attacks. For example, M. Bellare, A. Desai, E. Jokipii, and P. Rogaway, in "A Concrete Security Treatment of Symmetric Encryption," Proceedings of the 38th Symposium on Foundations of Computer Science, IEEE, 1997, pp. 394–403, demonstrate that the CBC and XOR schemes are secure in the left-or-right (or real-or-random) sense, which in turn implies that they are confidentiality-secure against chosen-plaintext attacks (viz., S. Goldwasser and M. Bellare: "Lecture Notes on Cryptography," 1999, available at www-cse.ucsd.edu/users/mihir/papers/gb.pdf). Similarly, those skilled in the art can easily show that other schemes, such as PCBC and "infinite garble extension" schemes, are also confidentiality-secure against chosen-plaintext attacks. However, not all schemes for the encryption of multi-block data or messages are confidentiality-secure against chosen-plaintext attacks. For example, it is well known in the art that the Electronic Codebook (ECB) mode of encryption (viz., NBS FIPS Pub 81, titled "DES Modes of Operation," National Bureau of Standards, U.S. Department of Commerce, December 1980) is not confidentiality-secure against chosen-plaintext attacks (viz., S. Goldwasser and M. Bellare: "Lecture Notes on Cryptography," 1999, available at www-cse.ucsd.edu/users/mihir/papers/gb.pdf).

It is also well known to those skilled in the art that encryption schemes which are confidentiality-secure against chosen-plaintext attacks do not, by themselves, preserve message integrity (authenticity). All encryption schemes known in the art to date typically use additional methods to provide for the integrity of encrypted multi-block data and messages. Several such methods have been surveyed by A. J. Menezes, P. van Oorschot, and S.Vanstone, in their book entitled "Handbook of Applied Cryptography," CRC Press, 1997. One of the known methods uses an additional cryptographic primitive besides the block cipher, namely a hash function, to provide integrity for encrypted messages. This method requires that the value obtained by applying the hash function to a plaintext be concatenated with the plaintext before encryption. Upon receipt of an encrypted message, the message is decrypted and accepted only after the integrity check is passed; i.e., the check passes if the value of the hash function when applied to the decrypted plaintext matches the hash value decrypted along with, and separated from, the decrypted plaintext. Encryption schemes that use two cryptographic primitives (e.g., block ciphers and hash functions) to provide both message confidentiality and integrity are embodied in commercial systems such as Kerberos V5 as described in RFC 1510, "The Kerberos network authentication service (V5)," Internet Request for Comments 1510, J. Kohl and B. C. Neuman, September 1993. Other known schemes for obtaining the integrity of encrypted multi-block data and messages can use only a single cryptographic primitive (i.e., a block cipher) but require two passes over the data or message; i.e., one pass for encryption with one secret key, and an additional pass for computing a Message Authentication Code (MAC) for the plaintext data or message with a separate secret key; or an additional pass for computing the MAC for the encrypted data or message with a separate secret key. Both the encrypted data or message and the corresponding MAC represent the output of these encryption schemes.

Encryption schemes that require two sequential passes over the data or message and use only one cryptographic primitive, and those that use two cryptographic primitives sequentially, to provide integrity of encrypted messages or data (1) decrease the performance of message and data encryption considerably, and (2) cannot be applied to real-time applications where commencing verification of message integrity cannot be deferred until the end of message decryption (viz., E. Petrank and C. Rackoff: "CBC MAC for Real-Time Data Sources," DIMACS Technical Report, TR 97-26, Rutgers University, New Brunswick, N.J.; manuscript also available at www.cs.technion.ac.il/~erez/publications.html, 1999). Furthermore, schemes using one cryptographic primitive and two processing passes concurrently, and those using the two cryptographic primitives concurrently, can achieve high-performance for confidentiality and integrity but require substantial implementation complexity, cost, and additional power, and are less suitable for implementation in low-power applications, and low-power, low-cost hardware devices.

Past attempts to overcome these shortcomings in message or data integrity protection with traditional encryption schemes (e.g., CBC, PCBC) relied on non-cryptographic Manipulation Detection Codes (MDCs), particularly on checksums, such as 32-bit Cyclic Redundancy Codes (CRC- 32) (viz., RFC 1510, "The Kerberos network authentication service (V5)", Internet Request for Comments 1510, J. Kohl and B. C. Neuman, September 1993; R. R. Juneman, S. M. Mathias, and C. H. Meyer: "Message Authentication with Manipulation Detection Codes," Proc. of the IEEE Symp. on Security and Privacy, Oakland, Calif., April 1983, pp. 33–54). However, all past attempts to protect the integrity of encrypted messages with non-cryptographic MDC functions failed. The reason for this is that non-cryptographic MDC functions cannot be used with traditional encryption schemes to detect integrity violations (e.g., forgeries) caused by chosen-plaintext attacks followed by verification of forged ciphertext messages by the adversary. These attacks are called the chosen-message attacks herein. In a successful chosen-message attack, an adversary is able to forge ciphertext messages that would be decrypted correctly with non-negligible probability by an unsuspecting party. The adversary need not know, nor be able to predict, the plaintext produced by correct decryption of the forged ciphertext. An example of such a successful attack against CBC encryption when CBC is used with the CRC-32—one of the strongest non-cryptographic MDC in use—in which the adversary can predict the plaintext of a forgery is provided by S. G. Stubblebine and V. D. Gligor in "On message integrity in cryptographic protocols," Proceedings of the 1992 IEEE Computer Society Symposium on Research in Security and Privacy, pp. 85–104, 1992. Other block encryption schemes that are susceptible to chosen-message attacks when using the typical non-cryptographic MDCs include the PCBC scheme (viz., J. T. Kohl: "The use of encryption in Kerberos for network authentication", Advances in Cryptology-CRYPTO '89 (LNCS 435), pp. 35–43, 1990; and A. J. Menezes, P. C. van Oorschot, and S. A. Vanstone: "Handbook of Applied Cryptography", CRC Press, Boca Raton, 1997), the "infinite garble extension" scheme, and the XOR schemes.

Furthermore, encryption schemes that use non-cryptographic MDC functions have not generally offered the possibility of processing encryption and decryption operations in a parallel or pipelined fashion, which has limited their applicability to sequential processing.

SUMMARY OF THE INVENTION

The inventors have recognized, and it is an aspect of this invention, that it is highly advantageous to provide encryption schemes that several or all of the following aspects (1) require only one processing pass over the data or message with only one cryptographic primitive (i.e., the block cipher), (2) withstand chosen-message attacks, (3) can be used for high-performance and low-power applications, and low-power, low-cost hardware devices, (4) are suitable for real-time applications, and (5) can be used in parallel or pipelined fashion in addition to that of the standard sequential processing.

It has been recognized by the present inventors that prior-art block encryption schemes do not achieve both confidentiality and integrity in one single processing pass over the input data using a single cryptographic primitive. In the prior art, block encryption schemes that require two passes over the data (e.g., one for encryption and one for computing a MAC) and a single cryptographic primitive, or two cryptographic primitives (e.g., block cipher and hash function), to provide both confidentiality and integrity, result in decreased performance or demand additional power when compared to schemes using a single cryptographic primitive (i.e., the block cipher) in one pass over the data. Hence, prior-art block-encryption schemes are less suitable for use in high-performance, low-power applications, and low-power, low-cost hardware devices. Furthermore, these prior-art block encryption schemes cannot be used in most real-time applications for embedded systems where commencing integrity verification cannot be deferred until the completion of message decryption.

It has also been recognized by the present inventors that, despite their inadequacy in detecting integrity violations caused by chosen-message attacks when used with traditional encryption schemes (e.g., CBC, PCBC, "infinite garble extension," XOR), it is advantageous to develop new encryption schemes that use non-cryptographic Manipulation Detection Code functions to protect both data confidentiality and integrity because these functions add only a small overhead to the encryption and decryption operations. Among these non-cryptographic MDC functions, those that can be computed in a parallel or pipelined manner have been of particular interest, and henceforth we refer to them as the (non-cryptographic) high-performance Manipulation Detection Code (hpMDC) functions.

There remains a need for secure block encryption methods that provide data confidentiality and integrity with a single cryptographic primitive in a single processing pass over the data by using a non-cryptographic (high performance) Manipulation Detection Code function. There is a need for such block encryption methods that are applicable to real-time applications. There is a further need for such block encryption methods that are suitable for both software or hardware implementation, for high-performance, low-power applications. There is a yet further need for such block encryption methods that are suitable for low-power, low-cost hardware devices. There is a yet further need for such block encryption methods that allow encryption and decryption in sequential, parallel or pipelined manners.

Briefly, the present invention comprises, in a first embodiment, an encryption method for providing both data confidentiality and integrity for a message, comprising the steps of: receiving an input plaintext string comprising a message and padding it as necessary such that its length is a multiple of l bits; partitioning the input plaintext string a length that is a multiple of l bits into a plurality of equal-size blocks of l bits in length; creating an MDC block of l bits in length that includes the result of applying a non-cryptographic Manipulation Detection Code (MDC) function to the plurality of the equal-size blocks; making one and only one processing pass with a single cryptographic primitive over each of the equal-size blocks and the MDC block to create a plurality of hidden ciphertext blocks each of l bits in length; and performing a randomization function over the plurality of hidden ciphertext blocks to create a plurality of output ciphertext blocks each of l bits in length.

In a further aspect of the present invention, the making one and only one processing pass step comprises processing each of the equal-size blocks and the MDC block by an encryption scheme that is confidentiality-secure against chosen-plaintext attacks, wherein each of the equal-size blocks and the MDC block is processed by a block cipher using a first secret key to obtain the plurality of hidden ciphertext blocks; and wherein the performing a randomization function step comprises combining each of the hidden ciphertext blocks with a corresponding element of a sequence of unpredictable elements to create a set of output blocks of the ciphertext, wherein a hidden ciphertext block identified by an index i is combined with the element of the sequence identified by index i by an operation that has an inverse.

In a further aspect of the present invention, the creating an MDC block step comprises: applying the non-cryptographic MDC function to the partitioned plaintext blocks; and combining the result with a secret, l-bit random vector generated on a per-message basis to obtain the MDC block.

In a further aspect of the present invention, the combining step comprises performing the combination using an bit-wise exclusive-or function.

In a further aspect of the present invention, there is provided the step of generating the secret random vector from a secret random number generated on a per-message basis.

In a further aspect of the present invention, there is provided the step of appending the created MDC block after a last block of the set of equal-sized blocks comprising the padded plaintext string.

In a further aspect of the present invention, the encryption scheme is cipher block chaining CBC; and further comprising the step of representing an initialization vector for the CBC as the secret random vector.

In a further aspect of the present invention, the hidden ciphertext blocks from the processing step comprise n+1 hidden ciphertext blocks each of l-bit length, where n is the total number of blocks in the set of equal-sized blocks of the padded input plaintext string.

In a further aspect of the present invention, there is provided the step of generating each of a plurality of the unpredictable elements of the sequence of unpredictable elements by combining a different element identifier for each of the unpredictable elements and a secret random number.

In a further aspect of the present invention, there is provided the step of generating each of a plurality of the unpredictable elements of the sequence of unpredictable elements by combining a different element identifier for each of the unpredictable elements and the secret random number.

In a further aspect of the present invention, there is provided the steps of: enciphering the secret random number using the block cipher using the secret first key; and including this enciphered secret random number as one of the output ciphertext blocks.

In a further aspect of the present invention, the secret random vector is generated by enciphering a secret random number of l bits in length, the enciphering using the block cipher using a secret second key.

In a further aspect of the present invention, the secret random vector is generated by enciphering a variant of the secret random number of l bits in length, the enciphering using the block cipher using the secret first key.

In a further aspect of the present invention, the variant of the secret random number is obtained by adding a constant to the secret random number.

In a further aspect of the present invention, the secret random number is provided by a random number generator.

In a further aspect of the present invention, there are provided the steps of: generating the secret random number by enciphering a count of a counter initialized to a constant, the enciphering being performed with the block cipher using the secret first key; and incrementing the counter by one on every message encryption.

In a further aspect of the present invention, the counter is initialized to a constant whose value is the l-bit representation of negative one.

In a further aspect of the present invention, there is provided the step of initializing the counter to a secret value of l bits in length.

In a further aspect of the present invention, there is provided the step of outputting the counter value as an output block of the encryption scheme.

In a further aspect of the present invention, there is provided the step of sharing the secret random number between a sender and a receiver.

In a further aspect of the present invention, the non-cryptographic MDC function is a bit-wise exclusive-or function.

In a further aspect of the present invention, the encryption scheme is the CBC scheme of encryption.

In a further aspect of the present invention, the operation that has an inverse is the addition modulo $2^l$.

In a further aspect of the present invention, the operation that has an inverse is a bit-wise exclusive-or operation.

In a further aspect of the present invention, the operation that has an inverse is the subtraction modulo $2^l$ operation.

In a further aspect of the present invention, there are provided the steps of: generating the secret random vector from a secret random number of l-bit length; and generating each element in the sequence of unpredictable elements by modular $2^l$ multiplication of a different unique element identifier (i) for each element in the sequence of unpredictable elements and the secret random number.

In a further aspect of the present invention, there are provided the steps of generating the secret random vector from a secret random number of l-bit length; and generating each element in the sequence of unpredictable elements from the previous element by modular $2^l$ addition of the secret random number to the previous element, with a first element of the sequence being the secret random number itself.

In a yet further embodiment of the present invention, there is provided a decryption method that is the inverse of an encryption method which provides both data confidentiality and integrity, comprising the steps of: presenting a string including ciphertext string for decryption; partitioning the ciphertext string into a plurality of ciphertext blocks comprising l bits each; selecting n+1 ciphertext blocks from the plurality of ciphertext blocks representing n data blocks and one MDC block and performing a reverse randomization function on each of the selected n+1 ciphertext blocks to obtain a plurality of hidden ciphertext blocks each of l bits in length; making one and only one processing pass with a single cryptographic primitive that is the inverse of an encryption single cryptographic primitive over the plurality of hidden ciphertext blocks to obtain a plurality of plaintext blocks comprising l bits each; verifying integrity of the plaintext blocks using a non-cryptographic Manipulation Detection Code (MDC) function; outputting the plurality of plaintext blocks as an accurate plaintext string if the integrity verification passes; and outputting a failure indicator if the integrity verification fails.

In a further aspect of the present invention, the performing the reverse randomization function comprises: deriving a secret random number from the ciphertext string presented for decryption; generating a sequence of unpredictable elements each of l-bit length from the secret random number in a same manner as used at the encryption method; selecting n+1 ciphertext blocks from the plurality of ciphertext blocks representing n data blocks and one MDC block in a same order as that used at the encryption method, and combining the selected ciphertext blocks with the sequence of unpredictable elements to obtain a plurality of hidden ciphertext blocks, such that each of the n+1 ciphertext blocks identified by index i is combined with the element of the sequence of unpredictable elements identified by index i, by the inverse of an operation used at the encryption method; wherein the step of making one and only one processing pass comprises decrypting the plurality of hidden ciphertext blocks with the inverse of the block cipher used at an encryption method with a first secret key (K), the result of the decryption being a plurality of n decrypted plaintext data blocks and one decrypted MDC block each of l-bit length; and wherein the verifying integrity step comprises creating an MDC decryption block by applying the non-cryptographic Manipulation Detection Code function to the n decrypted plaintext data blocks and combining the result with a secret, l-bit random vector, the combining operation being the same as a combining operation at the encryption method, and the secret random vector being derived from the secret random number in the same manner as at the encryption method; and comparing the created MDC decryption block with the decrypted MDC block.

In a further aspect of the present invention, there are provided the steps of selecting the ciphertext block of a secret random number from the string presented for decryption; and deciphering the selected ciphertext block to obtain the secret random number.

In a further aspect of the present invention, the deciphering step comprises performing the deciphering with the inverse of the block cipher using the secret first key.

In a further aspect of the present invention, there are provided the steps of: for the encryption method, generating a secret random number by enciphering a count of a counter initialized to a constant, the enciphering being performed with the block cipher using the secret first key; and incrementing the counter by one on every message encryption; and further comprising for decrypting the ciphertext blocks of the partitioned ciphertext string the steps of: selecting a counter block representing the count of the counter from the string presented at decryption; and enciphering the selected counter block to obtain the secret random number.

In a further aspect of the present invention, the enciphering step comprises performing the enciphering with the block cipher using the secret first key.

In a further aspect of the present invention, the string presented for decryption is obtained by applying the encryption method that provides both data confidentiality and integrity to an input plaintext string, and further comprising the step of outputting the input plaintext string.

In a further embodiment of the present invention, there is provided a method for parallel encryption processing of a message comprising the steps of: partitioning the input plaintext string into a plurality of input plaintext segments; concurrently presenting each different one of the plurality of input plaintext segments to a different one of a plurality of encryption processors, each of the different processors using a different l-bit secret random number per segment to obtain a ciphertext segment using an encryption method providing both data confidentiality and integrity with a single processing pass over the input plaintext segment and a single cryptographic primitive, and using a non-cryptographic Manipulation Detection Code function, wherein the single cryptographic primitive is a l-bit block cipher using a secret first key; assembling the plurality of ciphertext segments into a ciphertext string; and outputting the ciphertext string.

In a further aspect of the present invention, the assembling step comprises including in the ciphertext string the number of ciphertext segments, a ciphertext segment index, a length of each ciphertext segment and a sequence of ciphertext segments.

In a further aspect of the present invention, the step is provided of generating the different l-bit secret random number per segment from a secret random number of l bits in length.

In a further aspect of the present invention, the step is provided of generating the different secret random number per segment from the secret random number of l bits by adding modulo $2^l$ a plaintext segment sequence index for that segment to the secret random number.

In a further aspect of the present invention, the steps are provided of: generating the secret random number of l bits in length by a random number generator; enciphering the secret random number with the block cipher using a first key; and including the enciphered secret random number as an output block of the output ciphertext string.

In a further aspect of the present invention, the steps are provided of: generating the secret random number of l bits in length by enciphering a counter initialized to a constant, the enciphering being done with the block cipher using the first key; and outputting the counter value as an output block of the output ciphertext string; and incrementing after every different message encryption the counter by a number equal to a number of plaintext segments in the message.

In a further embodiment of the present invention, a method is provided for parallel decryption processing of a message comprising the steps of: presenting a string including the ciphertext string of a message for decryption; partitioning the ciphertext string into a plurality of ciphertext segments; concurrently presenting the plurality of ciphertext segments to a plurality of processors; obtaining a different secret random number per ciphertext segment from a secret random number in the same manner as at a parallel encryption method; decrypting each ciphertext segment using the different secret random number per ciphertext segment to obtain a plaintext segment, using a decryption method that is the inverse of an encryption method used in the parallel encryption method that provides both data confidentiality and integrity with a single processing pass over the input plaintext segment and a single cryptographic primitive, wherein the single cryptographic primitive is a l-bit block cipher using a secret first key, and using a non-cryptographic Manipulation Detection Code function for verifying integrity of the plaintext blocks of each plaintext segment; assembling the plurality of plaintext segments into a plaintext string; and verifying the integrity of the plaintext segments and their sequence and outputting the plaintext string if the integrity verification passes.

In a further aspect of the present invention, the step is provided of outputting a failure indicator if the integrity verification fails for at least one segment.

In a further aspect of the present invention, the steps are provided of: selecting a ciphertext block of the secret random number from the string presented for decryption; and deciphering the selected ciphertext block to obtain the secret random number.

In a further aspect of the present invention, the step is provided of performing the deciphering step with the inverse of a block cipher using a secret first key, the block cipher and the secret first key being the same as to those used at the message encryption method using the plurality of processors.

In a further aspect of the present invention, the steps are provided: for the parallel encryption method, generating the secret random number of l bits in length by enciphering a counter initialized to a constant, the enciphering being done with the block cipher using the first key; incrementing after every different message encryption the counter by a number equal to a number of plaintext segments in the message; and further comprising for decryption of the ciphertext segments of the partitioned ciphertext string the steps of: selecting a counter block holding the count of the counter from the string presented for decryption; and enciphering the selected counter block to obtain the secret random number.

In a further aspect of the present invention, the enciphering the counter block step comprises enciphering with the block cipher using the same key as that used for encryption using a plurality of processors.

In a further embodiment of the present invention, an encryption program product is provided for providing both data confidentiality and integrity for a message, comprising: first code for receiving an input plaintext string comprising a message and padding it as necessary such that its length is a multiple of l bits; second code for partitioning the padded input plaintext string into a plurality of equal-size blocks of l bits in length; third code for creating an MDC block of l bits in length that includes the result of applying a non-cryptographic Manipulation Detection Code (MDC) function to the plurality of the equal-size blocks; fourth code for making one and only one processing pass with a single cryptographic primitive over each of the equal-size blocks and the MDC block to create a plurality of hidden ciphertext blocks each of l bits in length; and fifth code for performing a randomization function over the plurality of hidden ciphertext blocks to create a plurality of output ciphertext blocks each of l bits in length.

In a further aspect of the present invention, the fourth code for making one and only one processing pass step comprises code for processing each of the equal-size blocks and the MDC block by an encryption scheme that is confidentiality-secure against chosen-plaintext attacks, wherein each of the equal-size blocks and the MDC block is processed by a block cipher using a first secret key (K) to obtain the plurality of hidden ciphertext blocks; and wherein the fifth code for performing a randomization function comprises code for combining each of the hidden ciphertext blocks with a corresponding element of a sequence of unpredictable elements to create a set of output blocks of the ciphertext, wherein a hidden ciphertext block identified by an index i is combined with the element of the sequence identified by index i by an operation that has an inverse.

In a further aspect of the present invention, the third code for creating an MDC block step comprises: code for applying the non-cryptographic MDC function to the partitioned plaintext blocks; and code for combining the result with a secret, l-bit random vector generated on a per-message basis to obtain the MDC block.

In a further embodiment of the present invention, a decryption program product is provided that is the inverse of the encryption program product which provides both data confidentiality and integrity, comprising: first code for presenting a string including ciphertext string for decryption; second code for partitioning the ciphertext string into a plurality of ciphertext blocks comprising l bits each; third code for selecting n+1 ciphertext blocks from the plurality of ciphertext blocks representing n data blocks and one MDC block and performing a reverse randomization function on each of the selected n+1 ciphertext blocks to obtain a plurality of hidden ciphertext blocks each of l bits in length; fourth code for making one and only one processing pass with a single cryptographic primitive that is the inverse of an encryption single cryptographic primitive over the plurality of hidden ciphertext block to obtain a plurality of plaintext blocks comprising l bits each; fifth code for verifying integrity of the plaintext blocks using a non-cryptographic Manipulation Detection Code (MDC) function; sixth code for outputting the plurality of plaintext blocks as an accurate plaintext string if the integrity verification passes; and seventh code for outputting a failure indicator if the integrity verification fails.

In a further aspect of the present invention, the third code for performing the reverse randomization function comprises: code for deriving a secret random number from the ciphertext string presented for decryption; code for generating a sequence of unpredictable elements each of l-bit length from the secret random number in the same manner as used at an encryption program product; code for selecting n+1 ciphertext blocks from the plurality of ciphertext blocks representing n data blocks and one MDC block in the same order as that used at an encryption program product, and combining the selected ciphertext blocks with the sequence of unpredictable elements to obtain a plurality of hidden ciphertext blocks $(z_i)$, such that each of the n+1 ciphertext blocks identified by index i is combined with the element of the sequence of unpredictable elements identified by index i, by the inverse of the operation used at the encryption program product; wherein the fourth code for making one and only one processing pass comprises code for decrypting the plurality of hidden ciphertext blocks with the inverse of the block cipher used at an encryption program product with a first secret key (K), the result of the decryption being a plurality of n decrypted plaintext data blocks and one decrypted MDC block each of l-bit length; and wherein the fifth code for verifying integrity step comprises code for creating an MDC decryption block by applying the non-cryptographic Manipulation Detection Code function to the n decrypted plaintext data blocks and combining the result with a secret, l-bit random vector, the combining operation being the same as the combining operation at the encryption program product, and the secret random vector being derived from the secret random number in the same manner as at the encryption program product; and comparing the created MDC decryption block with the decrypted MDC block.

In a further embodiment of the present invention, an encryption system is disclosed for providing both data confidentiality and integrity for a message, comprising: a first component for receiving an input plaintext string comprising a message and padding it as necessary such that its length is a multiple of l bits; a second component for partitioning the padded input plaintext string into a plurality of equal-size blocks of l bits in length; a third component for creating an MDC block of l bits in length that includes the result of applying a non-cryptographic Manipulation Detection Code (MDC) function to the plurality of the equal-size blocks; a fourth component for making one and only one processing pass with a single cryptographic primitive over each of the equal-size blocks and the MDC block to create a plurality of hidden ciphertext blocks each of l bits in length; and a fifth component for performing a randomization function over the plurality of hidden ciphertext blocks to create a plurality of output ciphertext blocks each of l bits in length.

In a further aspect of the present invention, the fourth component for making one and only one processing pass step comprises a component for processing each of the equal-size blocks and the MDC block by an encryption scheme that is confidentiality-secure against chosen-plaintext attacks, wherein each of the equal-size blocks and the MDC block is processed by a block cipher using a first secret key to obtain the plurality of hidden ciphertext blocks; and wherein the fifth component for performing a randomization function comprises a component for combining each of the hidden ciphertext blocks with a corresponding element of a sequence of unpredictable elements to create a set of output blocks of the ciphertext, wherein a hidden ciphertext block identified by an index i is combined with the element of the sequence identified by index i by an operation that has an inverse.

In a further aspect of the present invention, the third component for creating an MDC block step comprises: a component for applying the non-cryptographic MDC function to the partitioned plaintext blocks; and a component for combining the result with a secret, l-bit random vector generated on a per-message basis to obtain the MDC block.

In a further embodiment of the present invention, a decryption system is provided that is the inverse of an encryption system which provides both data confidentiality and integrity, comprising: a first component for presenting a string including ciphertext string for decryption; a second component for partitioning the ciphertext string into a plurality of ciphertext blocks comprising l bits each; a third component for selecting n+1 ciphertext blocks from the plurality of ciphertext blocks representing n data blocks and one MDC block and performing a reverse randomization function on each of the selected n+1 ciphertext blocks to obtain a plurality of hidden ciphertext blocks each of l bits in length; a fourth component for making one and only one processing pass with a single cryptographic primitive that is the inverse of an encryption single cryptographic primitive over the plurality of hidden ciphertext block to obtain a plurality of plaintext blocks comprising l bits each; a fifth component for verifying integrity of the plaintext blocks using a non-cryptographic Manipulation Detection Code (MDC) function; and a sixth component for outputting the plurality of plaintext blocks as an accurate plaintext string if the integrity verification passes; and a seventh component for outputting a failure indicator if the integrity verification fails.

In a further aspect of the present invention, the third component for performing the reverse randomization function comprises: a component for deriving a secret random number from the ciphertext string presented for decryption; a component for generating a sequence of unpredictable elements each of l-bit length from the secret random number in the same manner as used at an encryption system; a component for selecting n+1 ciphertext blocks from the plurality of ciphertext blocks representing n data blocks and one MDC block in the same order as that used at an encryption system, and combining the selected ciphertext blocks with the sequence of unpredictable elements to obtain a plurality of hidden ciphertext blocks, such that each of the n+1 ciphertext blocks identified by index i is combined with the element of the sequence of unpredictable elements identified by index i, by the inverse of the operation used at the encryption system; wherein the fourth component for making one and only one processing pass comprises a component for decrypting the plurality of hidden ciphertext blocks with the inverse of the block cipher used at an encryption system with a first secret key (K), the result of the decryption being a plurality of n decrypted plaintext data blocks and one decrypted MDC block each of l-bit length; and wherein the fifth component for verifying integrity step comprises a component for creating an MDC decryption block by applying the non-cryptographic Manipulation Detection Code function to the n decrypted plaintext data blocks and combining the result with a secret, l-bit random vector, the combining operation being the same as the combining operation at the encryption system, and the secret random vector being derived from the secret random number in the same manner as at the encryption system; and comparing the created MDC decryption block with the decrypted MDC block.

In a further embodiment of the present invention, a program product is provided for parallel encryption processing of a message comprising: first code for partitioning the input plaintext string into a plurality of input plaintext segments; second code for concurrently presenting each different one of the plurality of input plaintext segments to a different one of a plurality of encryption processors, each of the different processors using a different l-bit secret random number per segment to obtain a ciphertext segment using an encryption code providing both data confidentiality and integrity with a single processing pass over the input plaintext segment and a single cryptographic primitive, and using a non-cryptographic Manipulation Detection Code function, wherein the single cryptographic primitive is a l-bit block cipher using a secret first key; third code for assembling the plurality of ciphertext segments into a ciphertext string; and fourth code for outputting the ciphertext string.

In a further aspect of the present invention, the third code for assembling comprises code for including in the ciphertext string the number of ciphertext segments, a ciphertext segment index, a length of each ciphertext segment and a sequence of ciphertext segments.

In a further embodiment of the present invention, a program product is provided for parallel decryption processing of a message comprising: first code for presenting a string including the ciphertext string of a message for decryption; second code for partitioning the ciphertext string into a plurality of ciphertext segments; third code for concurrently presenting the plurality of ciphertext segments to a plurality of processors; fourth code for obtaining a different secret random number per ciphertext segment from a secret random number in the same manner as at the parallel encryption program product; fifth code for decrypting each ciphertext segment using the different secret random number per ciphertext segment to obtain a plaintext segment, using a decryption method that is the inverse of an encryption method used in the parallel encryption method that provides both data confidentiality and integrity with a single processing pass over the input plaintext segment and a single cryptographic primitive, wherein the single cryptographic primitive is a l-bit block cipher using a secret first key, and using a non-cryptographic Manipulation Detection Code function for verifying integrity of the plaintext blocks of each plaintext segment; sixth code for assembling the plurality of plaintext segments into a plaintext string; and seventh code for verifying the integrity of the plaintext segments and their sequence and outputting the plaintext string if the integrity verification passes.

In a further aspect of the present invention, there is provided code for outputting a failure indicator if the integrity verification fails for at least one segment.

In a yet further embodiment of the present invention, a system for parallel encryption processing of a message is provided comprising: a first component for partitioning the input plaintext string into a plurality of input plaintext segments; a second component for concurrently presenting each different one of the plurality of input plaintext segments to a different one of a plurality of encryption processors, each of the different processors using a different l-bit secret random number per segment to obtain a ciphertext segment using an encryption component providing both data confidentiality and integrity with a single processing pass over the input plaintext segment and a single cryptographic primitive, and using a non-cryptographic Manipulation Detection Code function, wherein the single cryptographic primitive is a 1-bit block cipher using a secret first key; a third component for assembling the plurality of ciphertext segments into a ciphertext string; and a fourth component for outputting the ciphertext string.

In a further aspect of the present invention, the third component for assembling comprises a component for including in the ciphertext string the number of ciphertext segments, a ciphertext segment index, a length of each ciphertext segment and a sequence of ciphertext segments.

In a yet further embodiment of the present invention, a system for parallel decryption processing of a message is provided comprising: a first component for presenting a string including the ciphertext string of a message for decryption; a second component for partitioning the ciphertext string into a plurality of ciphertext segments; a third component for concurrently presenting the plurality of ciphertext segments to a plurality of processors; a fourth component for obtaining a different secret random number per ciphertext segment from a secret random number in the same manner as at the parallel encryption system; a fifth component for decrypting each ciphertext segment using the different secret random number per ciphertext segment to obtain a plaintext segment, using a decryption method that performs the inverse operation of an encryption method used in the parallel encryption method that provides both data confidentiality and integrity with a single processing pass over the input plaintext segment and a single cryptographic primitive, wherein the single cryptographic primitive is a 1-bit block cipher using a secret first key, and using a non-cryptographic Manipulation Detection Code function for verifying integrity of the plaintext blocks of each plaintext segment; a sixth component for assembling the plurality of plaintext segments into a plaintext string; and a seventh component for verifying the integrity of the plaintext segments and their sequence and outputting the plaintext string if the integrity verification passes.

In a further aspect of the present invention, there is provided a component for outputting a failure indicator if the integrity verification fails for at least one segment.

BRIEF DESCRIPTION OF THE DRAWINGS

For a more complete understanding of the present invention and the advantages thereof, reference should be made to the following Detailed Description taken in connection with the accompanying drawings, in which.

DETAILED DESCRIPTION OF THE PREFERRED EMBODIMENT

Figure 1:
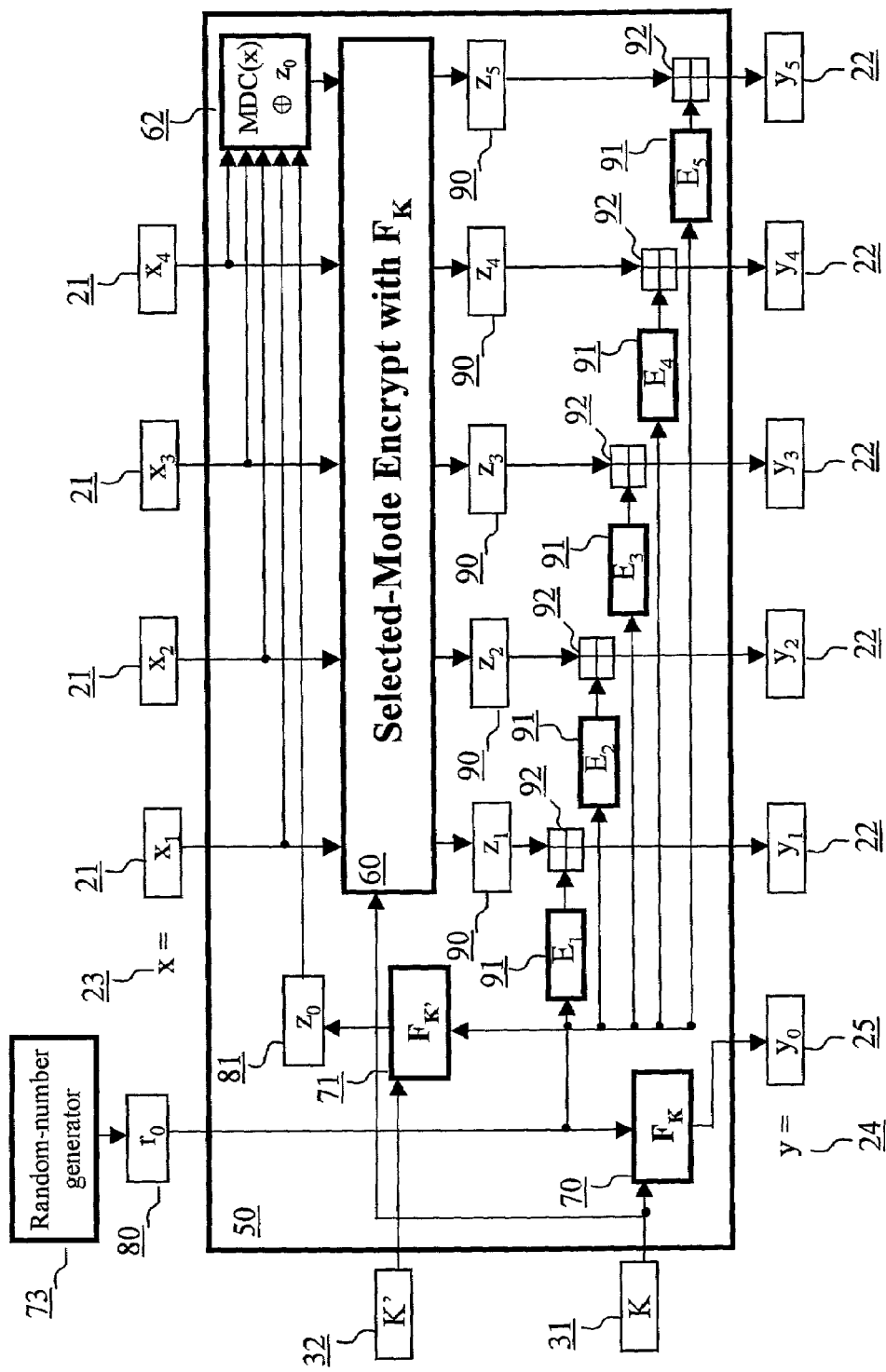
FIG. 1 illustrates a schematic diagram of the method of the present invention for the encryption of input plaintext string $x=x_1\ x_2\ x_3\ x_4$ using keys K and K' to obtain output ciphertext string $y=y_0\ y_1\ y_2\ y_3\ y_4\ y_5$.

Referring to FIG. 1, a plaintext string x 23 representing the input data is presented to the encryption scheme providing data confidentiality and integrity 50 resulting in an output ciphertext string y 24. It is assumed that the sender and the receiver share a pair of secret keys K and K' (i.e., a first key K 31, and a second key K' 32) and that a random-number generator 73 is available. Keys K and K' have the same length k and can be derived from a master key using key separation techniques well-known in the art. The input plaintext string x 23 is padded in some standard fashion so that it is a multiple of l bits. The padding is not shown in FIG. 1, as it is commonly known in the data processing art. It is assumed that the plaintext string x 23 is composed of n l-bit plaintext blocks 21. FIG. 1 shows an example plaintext string 23 composed of n=4 blocks, $x=x_1 x_2 x_3 x_4$.

In the description to follow, F is an l-bit block cipher with key length k, $F_K$ 70 is the l-bit block cipher F using secret key K 31, and $F_{K'}$ 71 is the l-bit block cipher F using secret key K' 32. $F_K(b)$ is an l-bit block representing the enciphering of the l-bit block b by $F_K$. Similarly, $F_{K'}(b)$ is an l-bit block representing the enciphering of the l-bit block b by $F_{K'}$.

The random-number generator 73 outputs a secret random number $r_0$ 80 of l bits in length that is further enciphered by $F_K$ 70, the block cipher F using the first key K 31, to obtain the block $y_0$ 25. In an alternate embodiment, the secret random number $r_0$ 80 is shared between the sender and the receiver, and hence it need not be generated by a random-number generator 73, and it need not be enciphered to obtain output block $y_0$ 25. In the alternate embodiment the sender and the receiver generate the same shared secret random number $r_0$ 80 from an already shared secret key using key separation techniques well-known in the art. The secret random number $r_0$ 80 is also enciphered using $F_{K'}$ 71, the block cipher F using the second key K' 32, to obtain a secret random vector $z_0$ 81 of l bits in length.

The input plaintext blocks 21 are combined using a non-cryptographic Manipulation Detection Code (MDC) function yielding the result MDC(x). Examples of the result MDC(x) are provided below. The result MDC(x) of the application of the MDC function is further combined with the secret random vector $z_0$ 81 resulting in the block value MDC(x) $\oplus z_0$ 62. Herein, the non-cryptographic MDC function is a high-performance MDC function. In the preferred embodiment of this invention, the non-cryptographic MDC is a bit-wise exclusive-or function; in the example of FIG. 1 in which the input plaintext string 23 is $x=x_1 x_2 x_3 x_4$, MDC(x)=$x_1 \oplus x_2 \oplus x_3 \oplus x_4$. In an alternate embodiment of this invention, the non-cryptographic MDC function uses addition modulo $2^l-1$; i.e., for the example of FIG. 1 in which the input plaintext string is $x=x_1 x_2 x_3 x_4$, MDC(x)=$x_1+x_2+x_3+x_4$ (modulo $2^l-1$). In yet another alternate embodiment of this invention, the non-cryptographic MDC function is any other parity checking code such as a cyclic redundancy code function. In the preferred embodiment of this invention, the combination operation between MDC(x) and the secret random vector $z_0$ 81 is the bit-wise exclusive-or operation; i.e. the resulting value 62 is MDC(x)$\oplus z_0$. In an alternate embodiment of this invention, the combination operation between MDC(x) and the secret random vector $z_0$ 81 is the addition modulo $2^l-1$; i.e., the resulting value 62 is MDC(x)+$z_0$ (modulo $2^l-1$).

The plurality of input plaintext blocks 21 and the block value MDC(x)$\oplus z_0$ 62 are submitted to a selected encryption scheme 60 that uses a block cipher $F_K$ using the first key K 31. In an aspect of this invention, the selected encryption scheme 60 is confidentiality-secure. In a further aspect of this invention, the selected confidentiality-secure encryption scheme 60 has the property that the input plaintext blocks 21 and the block value MDC(x) $\oplus z_0$ 62 are part of the input to $F_K$, the block cipher F using the first key K 31, used by the selected confidentiality-secure encryption scheme 60. In the preferred embodiment of this invention, the selected encryption scheme 60 is the cipher block chaining (CBC) mode (viz., NBS FIPS Pub 81, titled "DES Modes of Operation", National Bureau of Standards, U.S. Department of Commerce, December 1980). In an alternate embodiment of this invention, the selected encryption scheme 60 is the plaintext-cipher block chaining (PCBC) mode as described in A. J. Menezes, P. C. van Oorschot, and S. A. Vanstone: "Handbook of Applied Cryptography", CRC Press, Boca Raton, 1997), incorporated herein by reference. The invention, however, is not so limited, as other encryption schemes that are confidentiality secure and process the input plaintext blocks 21 and the block value MDC(x)$\oplus z_0$ 62 through $F_K$, the block cipher F using key K, may also be used for the selected encryption scheme 60. The requirement that the input plaintext blocks 21 and the block value MDC(x) $\oplus z_0$ 62 are processed through $F_K$, the block cipher F using key K, of the selected encryption scheme 60 eliminates the XOR$ and XORC encryption schemes described in M. Bellare, A. Desai, E. Jokipii, and P. Rogaway: "A Concrete Security treatment of Symmetric Encryption," Proceedings of the 38th Symposium on Foundations of Computer Science, IEEE, 1997, (394–403), as candidates for the selected encryption scheme 60.

The application of the selected encryption scheme 60 results into a plurality of hidden ciphertext blocks 90 of l-bit length; the number of hidden ciphertext blocks 90 is greater by one than the number of the input plaintext blocks 21; i.e. it is n+1. For the example of FIG. 1, wherein n=4, the plurality of hidden ciphertext blocks 90 comprises n+1=5 blocks $z_1, z_2, z_3, z_4, z_5$. These hidden ciphertext blocks 90 are submitted to a randomization step comprising, in one embodiment, applying a combination operation 92 to each hidden ciphertext block $z_i$ 90 and each l-bit element $E_i$ 91 of a sequence of n+1 elements. Each of these elements $E_i$ 91 is unpredictable because it is obtained by combining the secret random number $r_0$ 80 and the element identifier i such that for any given l-bit constant a, the probability of the event $E_i=a$ is negligible, wherein the notion of negligible probability is well-known to those skilled in the art (viz., M. Naor and O. Reingold: "From Unpredictability to Indistinguishability: A Simple Construction of Pseudo-Random Functions from MACs," Advances in Cryptology—CRYPTO '98 (LNCS 1462), pp. 267–282, 1998; M. Bellare, A. Desai, E. Jokipii, and P. Rogaway: "A Concrete Security Treatment of Symmetric Encryption," Proceedings of the 38th Symposium on Foundations of Computer Science, IEEE, 1997, pp. 394–403). The fact that these elements $E_i$ 91 are unpredictable means that enough of their l bits remain unknown so that the probability of the event $E_i=a$ is negligible. In the preferred embodiment of this invention, each unpredictable element $E_i$ 91 is obtained by multiplication modulo $2^l$ of the element index i and the secret random number $r_0$ 80. In this preferred embodiment, when encryption is performed sequentially, each element of the sequence $E_{i+1}$ (where i≧1) is generated from the previous element $E_i$ by modular $2^l$ addition of the secret random number $r_0$, the first element of the sequence being the secret random number $r_0$ itself, namely $E_1=r_0$. It should be appreciated by those skilled in the art, and is a further aspect of this invention, that the unpredictable elements 91 and the combination operation 92 can be obtained in other ways that do not depart from the spirit and scope of the present invention as set forth in the claims. In an alternate embodiment of this invention, the unpredictable elements $E_i$ are the elements of the linear congruence sequence defined by $E_i=a^i \times r_0$, where a is called the multiplier and is chosen to pass all the necessary spectral tests, i is the element index, i=1, ..., n+1, and $r_0$ is the secret random number 80, as described by D. E. Knuth in "The Art of Computer Programming—Volume 2: Seminumerical Algorithms," Addison-Wesley, 1981 (second edition), Chapter 3, incorporated herein by reference.

The combination operation 92 is an operation that has an inverse. In the preferred embodiment of this invention, the combination operation 92 is the modular $2^l$ addition, whereby each ciphertext block is obtained as $y_i=z_i+E_i$ modulo $2^l$. In an alternate embodiment of this invention, the combination operation 92 is the bit-wise exclusive-or operation, whereby each ciphertext block $y_i=z_i \oplus E_i$. In yet another alternate embodiment of this invention, the combination operation 92 is modular $2^l$ subtraction operation, whereby each ciphertext block $y_i=z_i-E_i$ modulo $2^l$. The invention, however, is not so limited, as other combination operations that have an inverse may also be used for operation 92.

The application of the combination operation 92 to the plurality of hidden ciphertext blocks 90 and the unpredictable elements 91 of the sequence results in a plurality of ciphertext blocks 22. Ciphertext block $y_0$ 25 and the plurality of ciphertext blocks 22 form the ciphertext string y 24 that has n+2 blocks and is the output data of the encryption scheme 50. For the example presented in FIG. 1, the ciphertext string 24 is $y=y_0\ y_1\ y_2\ y_3\ y_4\ y_5$; i.e., has n+2=6 blocks.

Figure 2:
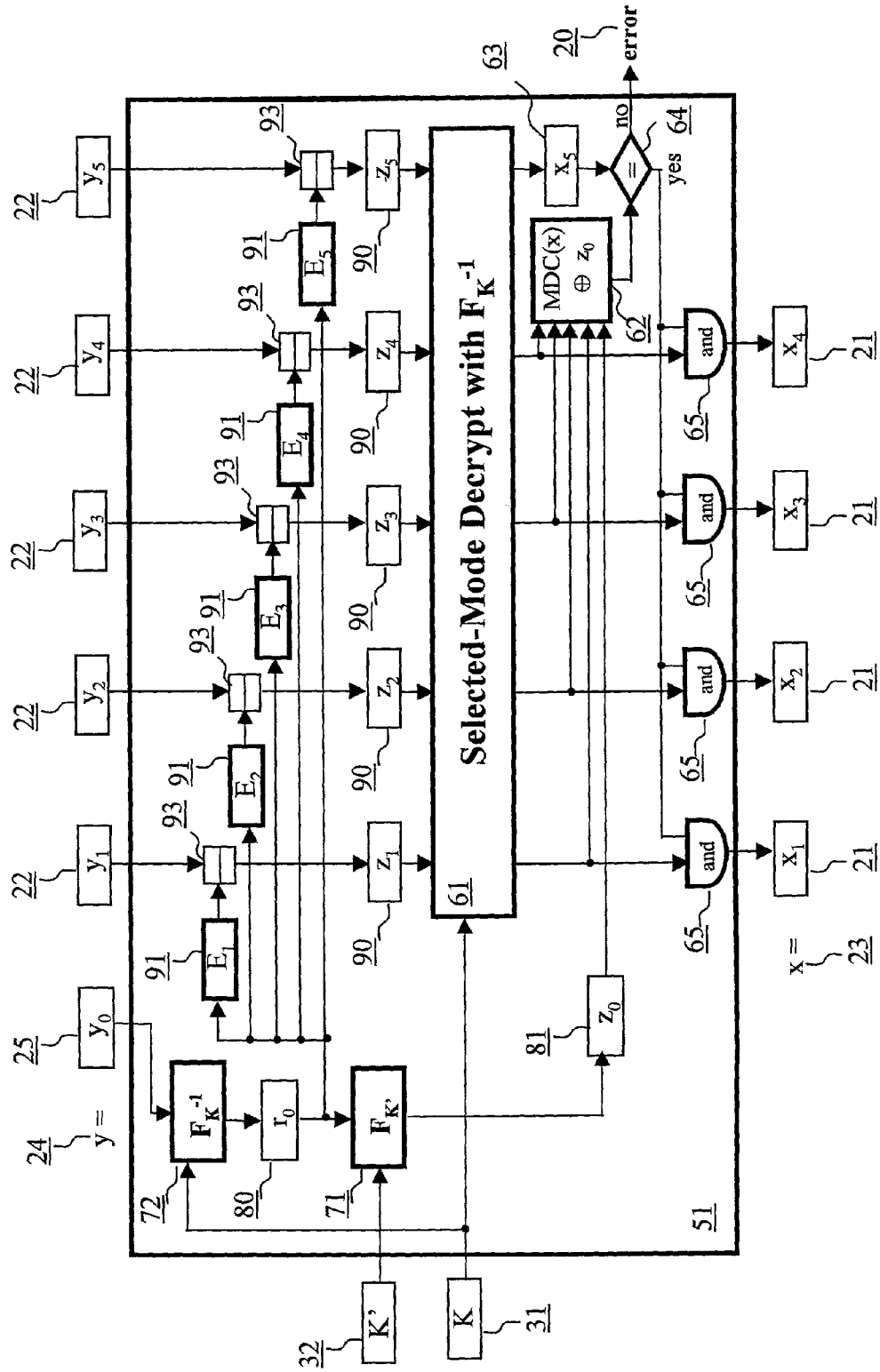
FIG. 2 illustrates a schematic diagram of the method of the present invention for the decryption of the input ciphertext string $y=y_0\ y_1\ y_2\ y_3\ y_4\ y_5$ using keys K and K' to obtain the output plaintext string $x=x_1\ x_2\ x_3\ x_4$ or the error indicator.

FIG. 2 represents the decryption of a ciphertext string y 24 composed of block $y_0$ 25 and n+1 ciphertext blocks 22 to either a plaintext string x 23 composed of n plaintext blocks 21 or an error indicator 20 by the decryption scheme providing data confidentiality and integrity 51. FIG. 2 shows an example wherein the ciphertext string y 24 is composed of block $y_0$ 25 and n+1=5 ciphertext blocks 22; i.e., $y=y_0\ y_1\ y_2\ y_3\ y_4\ y_5$, and the plaintext string x 23 has n=4 blocks; i.e., $x=x_1\ x_2\ x_3\ x_4$. It is assumed that the sender shares the pair of secret keys K and K' (i.e., a first key K 31, and a second key K' 32) with the receiver of the data string y 24.

$F^{-1}_K$ 72 is the inverse of the l-bit block cipher F using secret key K 31. $F^{-1}_K$ (d) is an l-bit block representing the deciphering of the l-bit block d by $F^{-1}_K$.

Block $y_0$ 25 is first deciphered using $F^{-1}_K$ 72, the inverse of the block cipher F using the secret first key K 31, resulting in the secret random number $r_0$ 80. The secret random number $r_0$ 80 is further enciphered using $F_{K'}$ 71, the block cipher F using second key K' 32, to obtain the secret random vector $z_0$ 81.

The n+1 ciphertext blocks $y_i$ 22 where $i \geq 1$ are submitted to the inverse combination operation 93 together with the unpredictable elements $E_i$ 91, computed at decryption, resulting in n+1 hidden ciphertext blocks $z_i$ 90. The unpredictable elements $E_i$ 91 are computed exactly in the same way as at encryption (viz., FIG. 1). The inverse combination operation 93 is the inverse of the combination operation 92. In the preferred embodiment of this invention, if the combination operation 92 is a modular $2^l$ addition operation, then the inverse combination operation 93 is the modular $2^l$ subtraction; i.e., each block $z_i=y_i-E_i$ modulo $2^l$. In an alternate embodiment of this invention, if the combination operation 92 is the bit-wise exclusive-or operation, then the inverse combination operation 93 is the bit-wise exclusive-or operation; i.e., each block $z_i=y_i \oplus E_i$. In yet another alternate embodiment of this invention, if the combination operation 92 is modular $2^l$ subtraction operation, then the inverse combination operation 93 is the modular $2^l$ addition; i.e., each block $z_i=y_i+E_i$ modulo $2^l$.

The n+1 hidden ciphertext blocks $z_i$ 90 are sent to the decryption function of the selected scheme 61 that uses $F^{-1}_K$, the inverse of the block cipher F using the first key K 31. The decryption of the selected scheme 61 outputs n plaintext blocks and one decrypted MDC block 63. For the example presented in FIG. 2, the n=4 plaintext blocks are $x_1$, $x_2$, $x_3$, $x_4$ and the decrypted MDC block 63 is $x_5$. Further, the non-cryptographic MDC function is applied to the n plaintext blocks and the result of this application is further combined with the secret vector $z_0$ 81 to yield the computed MDC block MDC(x)$\oplus z_0$ 62. Then the computed MDC block MDC(x)$\oplus z_0$ 62 and the decrypted MDC block 63 are compared for equality using the comparator 64. If the computed MDC block MDC(x)$\oplus z_0$ 62 and the decrypted MDC block 63 are not equal, then the result of the decryption of the data string y 24 is the error indicator 20. If the computed MDC block MDC(x)$\oplus z_0$ 62 and the decrypted MDC block 63 are equal, then the output from the logical "and" operators 65 is the result of the decryption of the ciphertext string y 24 using the decryption scheme 51; i.e., the result is the plaintext string x 23 comprising n plaintext blocks $x_i$ 21. In the example presented in FIG. 2, if computed MDC block MDC(x)$\oplus z_0$ 62 and the decrypted MDC block 63 are equal, then the output of the decryption scheme 51 is the plaintext string $x=x_1\ x_2\ x_3\ x_4$.

Figure 3:
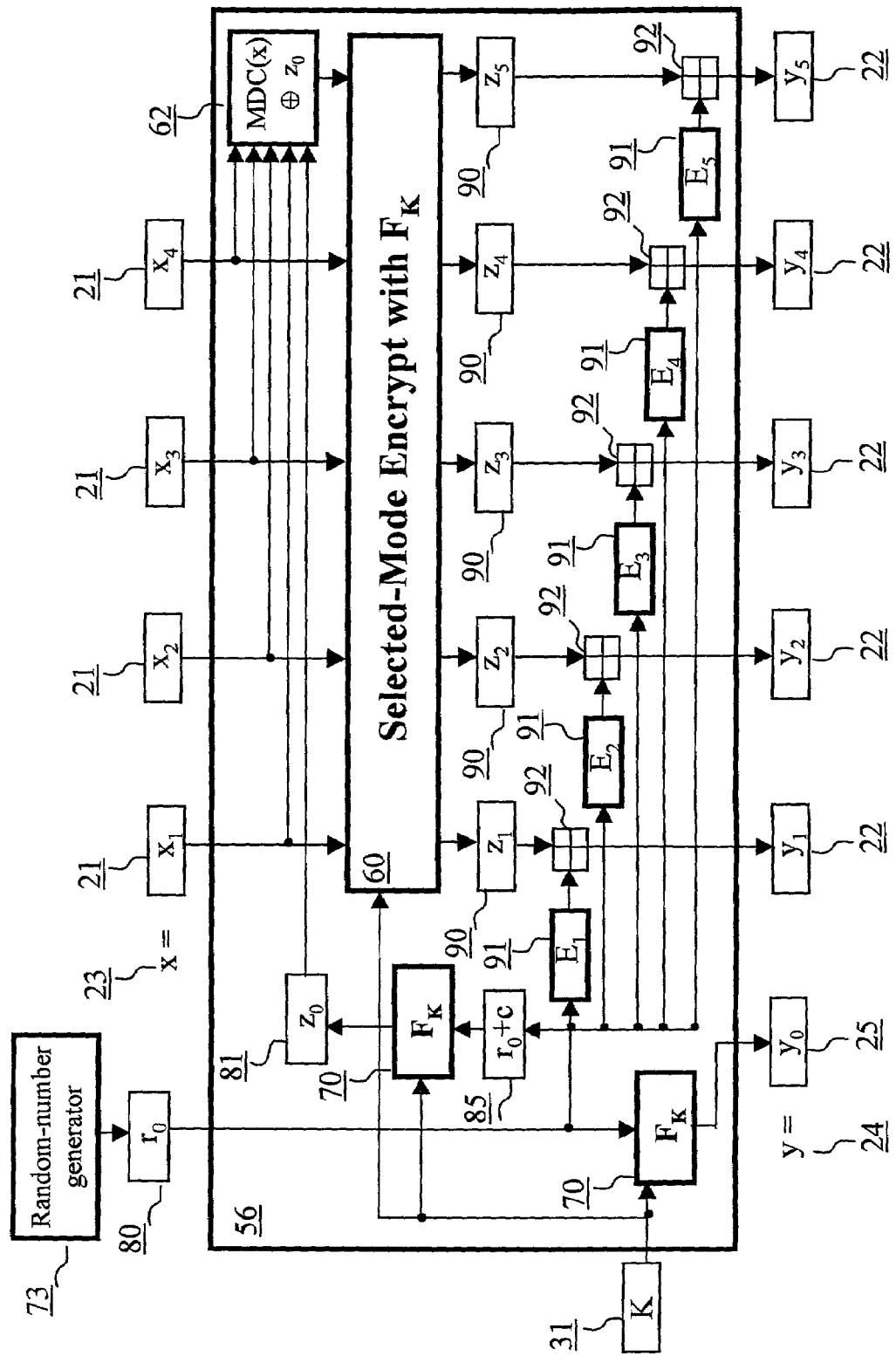
FIG. 3 illustrates a schematic diagram of the method of the present invention for the encryption of input plaintext string $x=x_1\ x_2\ x_3\ x_4$ using only one key K to obtain output ciphertext string $y=y_0\ y_1\ y_2\ y_3\ y_4\ y_5$.

FIG. 3 illustrates a schematic diagram of the method of the present invention for the encryption of input plaintext string x 23 using only one key K 31 to obtain output ciphertext string y 24 using the encryption scheme providing data confidentiality and integrity 56. The input plaintext string x 23 is padded in some standard fashion so that it is a multiple of l bits, and is partitioned into n l-bit plaintext blocks 21. FIG. 3 shows an example plaintext string 23 composed of n=4 blocks, $x=x_1\ x_2\ x_3\ x_4$.

The random-number generator 73 outputs a secret random number $r_0$ 80 that is further enciphered by $F_K$ 70, the block cipher F using key K 31, to obtain the block $y_0$ 25. A variant $r_0+c$ 85 of the secret random number $r_0$ 80 is also enciphered using $F_K$ 70, the block cipher F using the same key K 31, to obtain the secret random vector $z_0$ 81. FIG. 3 shows an example in which the variant of the secret random number 85 is obtained from the addition modulo $2^l$ of the secret random number $r_0$ 80 with a constant c. The invention, however, is not so limited, as other variants of the secret random number 85 may also be used as input to $F_K$ 70, the block cipher F using key K 31, to obtain the secret random vector $z_0$ 81.

The input plaintext blocks 21 are combined using a non-cryptographic Manipulation Detection Code (MDC) function yielding the result MDC(x); the result MDC(x) of the application of the MDC function is further combined with the secret random vector $z_0$ 81 resulting in the block value MDC(x)$\oplus z_0$ 62. Herein, the non-cryptographic MDC function is a high-performance MDC function. In the preferred embodiment of this invention, the non-cryptographic MDC is a bit-wise exclusive-or function; in the example of FIG. 3 in which the input plaintext string 23 is $x=x_1\ x_2\ x_3\ x_4$, MDC(x)=$x_1 \oplus x_2 \oplus x_3 \oplus x_4$. In an alternate embodiment of this invention, the non-cryptographic MDC function uses addition modulo $2^l-1$; i.e., for the example of FIG. 3 in which the input plaintext string is $x=x_1\ x_2\ x_3\ x_4$, MDC(x)=$x_1+x_2+x_3+x_4$(modulo $2^l-1$). In yet another alternate embodiment of this invention, the non-cryptographic MDC function is any other parity checking code such as a cyclic redundancy code function. In the preferred embodiment of this invention, the combination operation between MDC(x) and the secret random vector $z_0$ 81 is the bit-wise exclusive-or operation; i.e. the resulting value 62 is MDC(x)$\oplus z_0$. In an alternate embodiment of this invention, the combination operation between MDC(x) and the secret random vector $z_0$ 81 is the addition modulo $2^l-1$; i.e., the resulting value 62 is MDC(x)+$z_0$ (modulo $2^l-1$).

The plurality of input plaintext blocks 21 and the block value MDC(x)$\oplus z_0$ 62 are submitted to the selected encryption scheme 60 that uses $F_K$, the block cipher F using the first key K 70. In an aspect of this invention, the selected encryption scheme 60 is confidentiality-secure. In a further aspect of this invention, the selected confidentiality-secure encryption scheme 60 has the property that the input plaintext blocks 21 and the block value MDC(x)⊕$z_0$ 62 are part of the input to $F_K$, the block cipher F using the first key K 31 used by the selected confidentiality-secure encryption scheme 60. In the preferred embodiment of this invention, the selected encryption scheme 60 is the cipher block chaining (CBC) mode (viz., NBS FIPS Pub 81, titled "DES Modes of Operation", National Bureau of Standards, U.S. Department of Commerce, December 1980). In an alternate embodiment of this invention, the selected encryption scheme 60 is the plaintext-cipher block chaining (PCBC) mode as described in A. J. Menezes, P. C. van Oorschot, and S. A. Vanstone: "Handbook of Applied Cryptography", CRC Press, Boca Raton, 1997), incorporated herein by reference. The invention, however, is not so limited, as other encryption schemes that are confidentiality secure and process the input plaintext blocks 21 and the block value MDC(x)⊕$z_0$ 62 through $F_K$, the block cipher F using key K, may also be used for the selected encryption scheme 60. The requirement that the input plaintext blocks 21 and the block value MDC(x)⊕$z_0$ 62 are processed through $F_K$, the block cipher F using key K, of the selected encryption scheme 60 eliminates the XOR$ and XORC encryption schemes described in M. Bellare, A. Desai, E. Jokipii, and P. Rogaway: "A Concrete Security Treatment of Symmetric Encryption," Proceedings of the 38th Symposium on Foundations of Computer Science, IEEE, 1997, (394–403), as candidates for the selected encryption scheme 60.

The application of the selected encryption scheme 60 results into a plurality of hidden ciphertext blocks 90 of l-bit length; the number of hidden ciphertext blocks 90 is greater by one than the number of the input plaintext blocks 21; i.e. it is n+1. For the example of FIG. 3, wherein n=4, the plurality of hidden ciphertext blocks 90 comprises n+1=5 blocks $z_1$, $z_2$, $z_3$, $z_4$, $z_5$. These hidden ciphertext blocks 90 are submitted to a randomization step comprising, by way of example, applying a combination operation 92 to each hidden ciphertext block $z_i$ 90 and each l-bit element $E_i$ 91 of a sequence of n+1 elements. Each of these elements $E_i$ 91 is unpredictable because it is obtained by combining the secret random number $r_0$ 80 and the element identifier i such that for any given l-bit constant a, the probability of the event $E_i$=a is negligible, wherein the notion of negligible probability is well-known to those skilled in the art (viz., M. Naor and O. Reingold: "From Unpredictability to Indistinguishability: A Simple Construction of Pseudo-Random Functions from MACs," Advances in Cryptology—CRYPTO '98 (LNCS 1462), pp. 267–282, 1998; M. Bellare, A. Desai, E. Jokipii, and P. Rogaway: "A Concrete Security Treatment of Symmetric Encryption," Proceedings of the 38th Symposium on Foundations of Computer Science, IEEE, 1997, pp. 394–403). In the preferred embodiment of this invention, each unpredictable element $E_i$ 91 is obtained my multiplication modulo $2^l$ of the element index i and the secret random number $r_0$ 80. In this preferred embodiment, when encryption is performed sequentially, each element of the sequence $E_{i+1}$ (where i≧1) is generated from the previous element $E_i$ by modular $2^l$ addition of the secret random number $r_0$, the first element of the sequence being the secret random number $r_0$ itself, namely $E_1$= $r_0$. It should be appreciated by those skilled in the art, and is a further aspect of this invention, that the unpredictable elements 91 and the combination operation 92 can be obtained in other ways that do not depart from the spirit and scope of the present invention as set forth in the claims. In an alternate embodiment of this invention, the unpredictable elements $E_i$ are the elements of the linear congruence sequence defined by $E_i$=$a^i$×$r_0$, where a is called the multiplier and is chosen to pass all the necessary spectral tests, i is the element index, i=1, . . . , n+1, and $r_0$ is the secret random number 80, as described by D. E. Knuth in "The Art of Computer Programming—Volume 2: Seminumerical Algorithms," Addison-Wesley, 1981 (second edition), Chapter 3, incorporated herein by reference.

The combination operation 92 is an operation that has an inverse. In the preferred embodiment of this invention, the combination operation 92 is the modular $2^l$ addition, whereby each ciphertext block is obtained as $y_i$=$z_i$+$E_i$ modulo $2^l$. In an alternate embodiment of this invention, the combination operation 92 is the bit-wise exclusive-or operation, whereby each ciphertext block $y_i$=$z_i$⊕$E_i$. In yet another alternate embodiment of this invention, the combination operation 92 is modular $2^l$ subtraction operation, whereby each ciphertext block $y_i$=$z_i$−$E_i$ modulo $2^l$. The invention, however, is not so limited, as other combination operations that have an inverse may also be used for operation 92.

The application of the combination operation 92 to the plurality of hidden ciphertext blocks 90 and the unpredictable elements 91 of the sequence results in a plurality of ciphertext blocks 22. Ciphertext block $y_0$ 25 and the plurality of ciphertext blocks 22 form the ciphertext string y 24 that has n+2 blocks and is the output data of the encryption scheme 50. For the example presented in FIG. 3, the ciphertext string 24 is y= $y_0$ $y_1$ $y_2$ $y_3$ $y_4$ $y_5$; i.e., has n+2=6 blocks.

Figure 4:
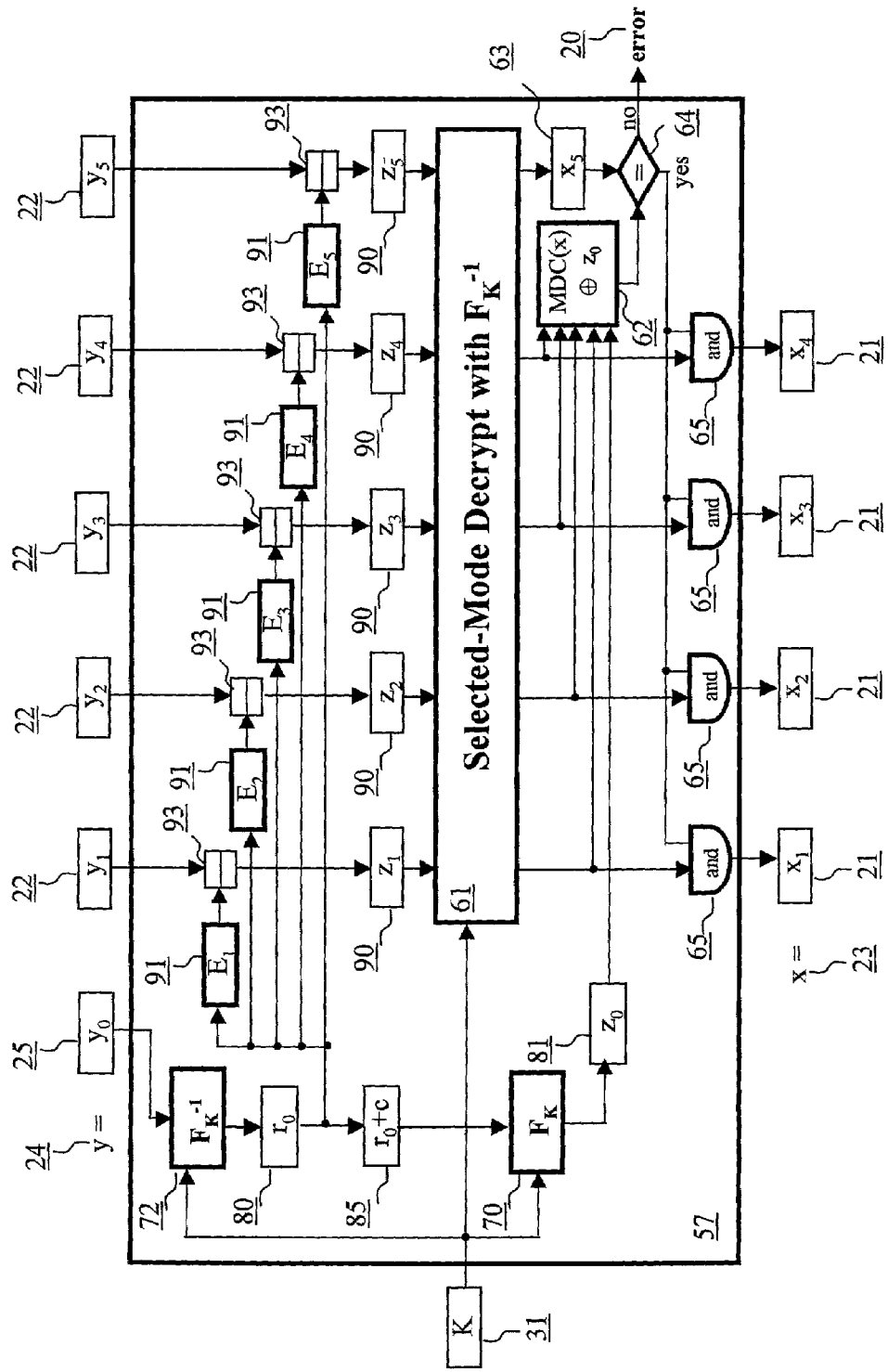
FIG. 4 illustrates a schematic diagram of the method of the present invention for the decryption of the input ciphertext string $y=y_0\ y_1\ y_2\ y_3\ y_4\ y_5$ using only one key K to obtain the output plaintext string $x=x_1\ x_2\ x_3\ x_4$ or the error indicator.

FIG. 4 illustrates a schematic diagram of the method of the present invention for the decryption of the input ciphertext string y 24 using only one key K 31 to obtain either the output plaintext string x 23 or the error indicator 20 by the decryption scheme providing data confidentiality and integrity 57.

Block $y_0$ 25 is first deciphered using $F^{-1}_K$ 72, the inverse of the block cipher F using key K 31, resulting in the secret random number $r_0$ 80. The same variant of the secret random number $r_0$+c 85 as used at encryption is enciphered using $F_K$ 70, the block cipher F using the same key K 31, to obtain the secret random vector $z_0$ 81.

The n+1 ciphertext blocks $y_i$ 22 where i≧1 are submitted to the inverse combination operation 93 together with the unpredictable elements $E_i$ 91, computed at decryption, resulting in n+1 hidden ciphertext blocks $z_i$ 90. The unpredictable elements $E_i$ 91 are computed exactly in the same way as at encryption (viz., FIG. 3). The inverse combination operation 93 is the inverse of the combination operation 92. In the preferred embodiment of this invention, if the combination operation 92 is a modular $2^l$ addition operation, then the inverse combination operation 93 is the modular $2^l$ subtraction; i.e., each block $z_i$=$y_i$−$E_i$ modulo $2^l$. In an alternate embodiment of this invention, if the combination operation 92 is the bit-wise exclusive-or operation, then the inverse combination operation 93 is the bit-wise exclusive-or operation; i.e., each block $z_i$=$y_i$⊕$E_i$. In yet another alternate embodiment of this invention, if the combination operation 92 is modular $2^l$ subtraction operation, then the inverse combination operation 93 is the modular $2^l$ addition; i.e., each block $z_i$=$y_i$+$E_i$ modulo $2^l$.

The n+1 hidden ciphertext blocks $z_i$ 90 are sent to the decryption function of the selected scheme 61 that uses $F^{-1}_K$, the inverse of the block cipher F using the first key K 31. The decryption of the selected scheme 61 outputs n plaintext blocks and one decrypted MDC block 63. For the example presented in FIG. 4, the n=4 plaintext blocks are $x_1$, $x_2$, $x_3$, $x_4$ and the decrypted MDC block 63 is $x_5$. Further, the non-cryptographic MDC function is applied to the n plaintext blocks and the result of this application is further combined with the secret vector $z_0$ 81 to yield the computed MDC block MDC(x)$\oplus z_0$ 62. Then the computed MDC block MDC(x)$\oplus z_0$ 62 and the decrypted MDC block 63 are compared for equality using the comparator 64. If the computed MDC block MDC(x)$\oplus z_0$ 62 and the decrypted MDC block 63 are not equal, then the result of the decryption of the data string y 24 is the error indicator 20. If the computed MDC block MDC(x)$\oplus z_0$ 62 and the decrypted MDC block 63 are equal, then the output from the logical "and" operators 65 is the result of the decryption of the ciphertext string y 24 using the decryption scheme 51; i.e., the result is the plaintext string x 23 composed of n plaintext blocks $x_i$. In the example presented in FIG. 4, if computed MDC block MDC(x)$\oplus z_0$ 62 and the decrypted MDC block 63 are equal, then the output of the decryption scheme 51 is the plaintext string $x=x_1\ x_2\ x_3\ x_4$.

Figure 5:
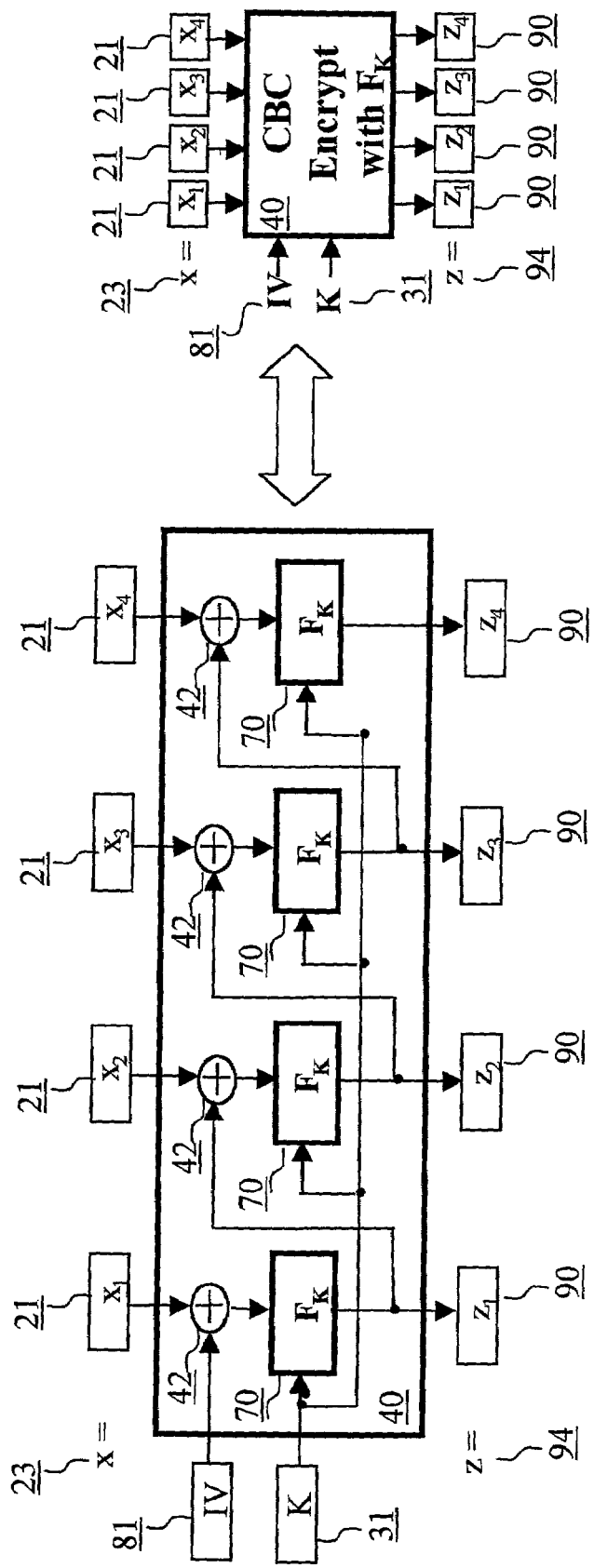
FIG. 5 illustrates a schematic diagram for the encryption using cipher-block chaining (CBC) of an input plaintext string $x=x_1\ x_2\ x_3\ x_4$ to obtain output ciphertext $z=z_1\ z_2\ z_3\ z_4$.

FIG. 5 illustrates a schematic diagram for encryption using as the selected encryption scheme the cipher-block chaining (CBC) mode, which is well known to those skilled in the art. Plaintext string x 23 is encrypted into ciphertext string z 94 using a key K 31 and an initialization vector IV 81. The input plaintext string x 23 is padded in some standard fashion so that it is a multiple of 1 bits. This multiple is n, and thus, plaintext string x 23 is composed of n plaintext blocks 21. Cipher-block chaining (CBC) comprises n steps of enciphering a combination of the current plaintext block $x_i$ 21 with the previous ciphertext block $z_{i-1}$ 90 using the bit-wise exclusive-or operation 42, the enciphering being done by $F_K$ 70, the block cipher F using key K 31, namely $z_i = F_K(x_{i-1} \oplus z_{i-1})$, for i=1, 2, ..., n where $z_0$=IV. The encryption using cipher-block chaining outputs the collection of n ciphertext blocks $z_i$ 90 as the ciphertext string z 94. FIG. 5 presents an example where n=4, the input plaintext string is $x=x_1\ x_2\ x_3\ x_4$ and the output plaintext string is $z=z_1\ z_2\ z_3\ z_4$.

Figure 6:
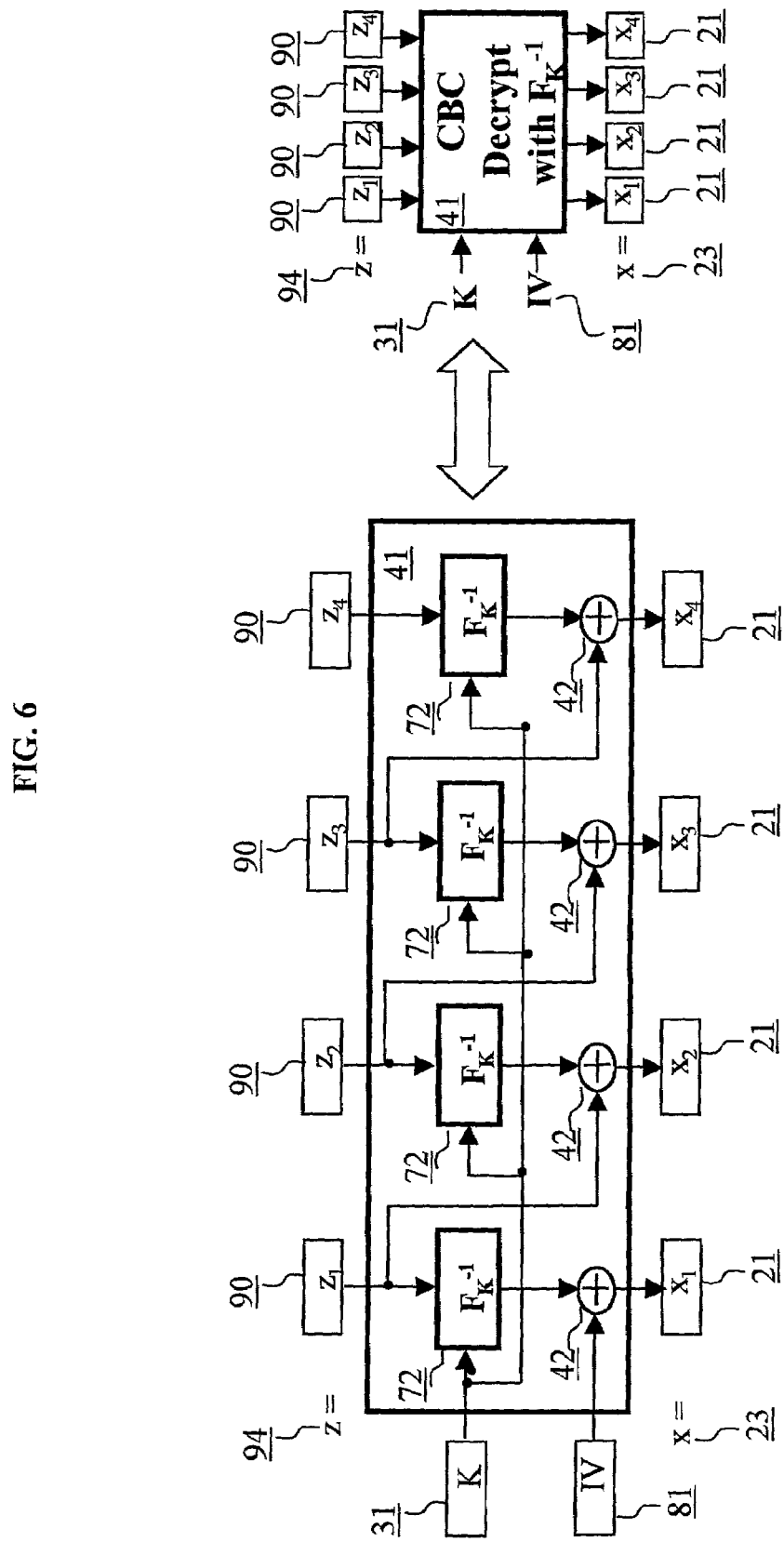
FIG. 6 illustrates a schematic diagram for the decryption using cipher-block chaining (CBC) of an input ciphertext string ciphertext $z=z_1\ z_2\ z_3\ z_4$ to obtain output plaintext string $x=x_1\ x_2\ x_3\ x_4$.

FIG. 6 illustrates a schematic diagram for decryption using as the selected encryption scheme (mode) the cipher-block chaining (CBC) mode, which is well known to those skilled in the art. Input ciphertext string z 94 is decrypted into an output plaintext string x 23 using a key K 31 and an initialization vector IV 81. Cipher-block chaining (CBC) comprises n steps of deciphering the current ciphertext block $z_i$ 90 using $F^{-1}{}_K$ 72, the inverse of the block cipher F using key K 31; the result of this deciphering is further combined with the previous ciphertext block $z_{i-1}$ 90 using the bit-wise exclusive-or operation 42, namely $x_i = F^{-1}{}_K(z_i) \oplus z_{i-1}$, for i=1, ..., n, where $z_0$=IV. The decryption using cipher-block chaining outputs the collection of n plaintext blocks 21 as the output plaintext string x 23. FIG. 6 presents an example where n=4, the input ciphertext string is $z=z_1\ z_2\ z_3\ z_4$ and the output plaintext string is $x=x_1\ x_2\ x_3\ x_4$.

Figure 7:
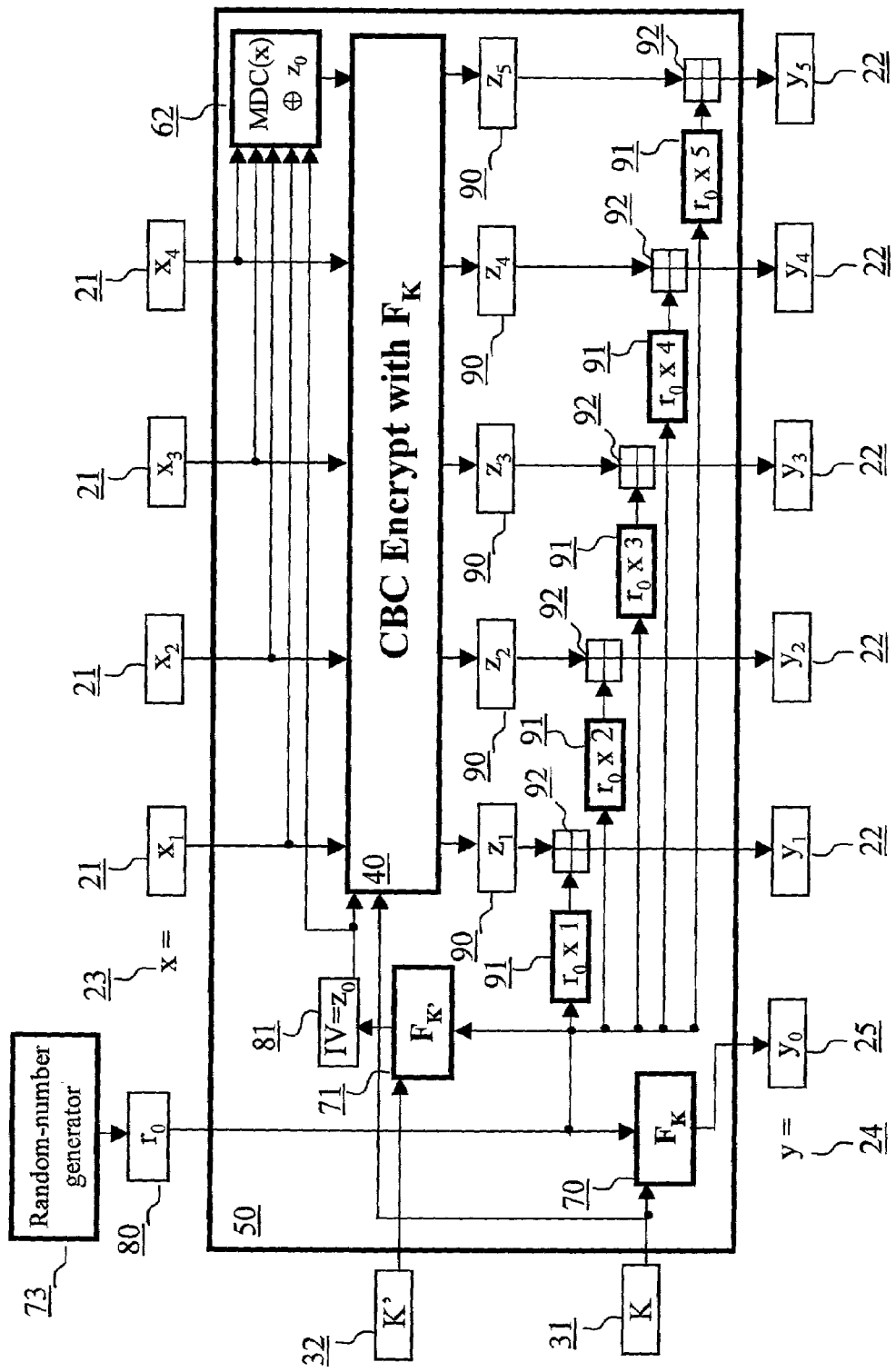
FIG. 7 illustrates a schematic diagram for the preferred embodiment of this invention of the stateless encryption scheme in which input plaintext string $x=x_1\ x_2\ x_3\ x_4$ is encrypted using keys K and K' to obtain output ciphertext $y=y_0\ y_1\ y_2\ y_3\ y_4\ y_5$ based on cipher-block chaining (CBC).

FIG. 7 illustrates a schematic diagram for the preferred embodiment of this invention of the stateless encryption scheme. The input plaintext string x 23 (which is padded in a standard way) containing n plaintext blocks $x_i$ 21 is encrypted using the encryption scheme 50 and the result of this encryption is the ciphertext string y 24 containing n+2 ciphertext blocks, namely ciphertext block $y_0$ 25 and n+1 ciphertext blocks $y_i$ 22 where i=1, 2, ..., n. The encryption uses a pair of secret keys K and K' (i.e., a first key K 31, and a second key K' 32). The random-number generator 73 outputs the secret random number $r_0$ 80 that is further enciphered with $F_K$ 70, the block cipher F using the first key K 31, and the result is ciphertext block $y_0$ 25. The secret random number $r_0$ is also enciphered with $F_{K'}$ 71, the block cipher F using the second key K' 32, to yield the secret random vector IV=$z_0$ 81.

In this embodiment, the plaintext blocks $x_i$ 21 and the secret random vector $z_0$ 81 are bit-wise exclusive-or-ed into MDC(x)$\oplus z_0$ 62; i.e., MDC(x)$\oplus z_0 = x_1 \oplus \ldots \oplus x_n \oplus z_0$, and this value is appended to the plaintext string x and submitted to cipher-block chaining encryption 40. The cipher-block chaining (CBC) encryption scheme 40 uses $F_K$, the block cipher F using the first key K 31, and as initialization vector IV=$z_0$ 81. The details about the implementation of the CBC encryption scheme 40 are provided in FIG. 5. In this embodiment, the CBC encryption scheme 40 outputs n+1 hidden ciphertext blocks $z_i$ 90. FIG. 7 shows an example where n=4; i.e. the hidden ciphertext blocks 90 are $z_1, z_2, z_3, z_4, z_5$.

In the preferred embodiment of this invention of the stateless encryption, the hidden ciphertext blocks 90 are submitted to a randomization step comprising applying a combination operation 92 to each hidden ciphertext block $z_i$ 90 and each l-bit element 91 of a sequence of n+1 elements. Each of these elements 91 is unpredictable because it is obtained by combining the secret random number $r_0$ 80 and the element identifier i such that for any given l-bit constant a, the probability of the event $r_0 \times i = a$ is negligible, wherein the notion of negligible probability is well-known to those skilled in the art (viz., M. Naor and O. Reingold: "From Unpredictability to Indistinguishability: A Simple Construction of Pseudo-Random Functions from MACs," Advances in Cryptology—CRYPTO '98 (LNCS 1462), pp. 267–282, 1998; M. Bellare, A. Desai, E. Jokipii, and P. Rogaway: "A Concrete Security treatment of Symmetric Encryption," Proceedings of the 38th Symposium on Foundations of Computer Science, IEEE, 1997, pp. 394–403). In the preferred embodiment of this invention, each unpredictable element 91 is obtained my multiplication modulo $2^l$ of the element index i with the secret random number $r_0$ 80. In the preferred embodiment of this invention for sequential block encryption, each element $r_0 \times (i+1)$ of the sequence of unpredictable elements (where i≧1) is generated from the previous element $r_0 \times i$ by modular $2^l$ addition of the secret random number $r_0$, the first element of the sequence being the random number $r_0$ itself It should be appreciated by those skilled in the art, and is a further aspect of this invention, that the unpredictable elements 91 and the combination operation 92 can be obtained in other ways that do not depart from the spirit and scope of the present invention as set forth in the claims. In an alternate embodiment of this invention, the unpredictable elements 91 are the elements of the linear congruence sequence defined by $a^i \times r_0$, where a is called the multiplier and is chosen to pass all the necessary spectral tests, i is the element index, i=1, ..., n+1, and $r_0$ is the secret random number 80, as described by D. E. Knuth in "The Art of Computer Programming—Volume 2: Seminumerical Algorithms," Addison-Wesley, 1981 (second edition), Chapter 3, incorporated herein by reference.

The combination operation 92 is an operation that has an inverse. In the preferred embodiment of this invention, the combination operation 92 is the modular $2^l$ addition, whereby each ciphertext block is obtained as $y_i = z_i + r_0 \times i$ modulo $2^l$. In an alternate embodiment of this invention, the combination operation 92 is the bit-wise exclusive-or operation. In yet another alternate embodiment of this invention, the combination operation 92 is the modular $2^l$ subtraction operation. The invention, however, is not so limited, as other combination operations that have an inverse may also be used for operation 92.

The application of the combination operation 92 to the plurality of hidden ciphertext blocks 90 and the unpredictable elements 91 of the sequence results in a plurality of ciphertext blocks 22. Ciphertext block $y_0$ 25 and the plurality of ciphertext blocks 22 form the ciphertext string y 24 that has n+2 blocks and is the output data of the encryption scheme 50. For the example presented in FIG. 7, the ciphertext string 24 is $y=y_0\ y_1\ y_2\ y_3\ y_4\ y_5$; i.e., has n+2=6 blocks.

Figure 8:
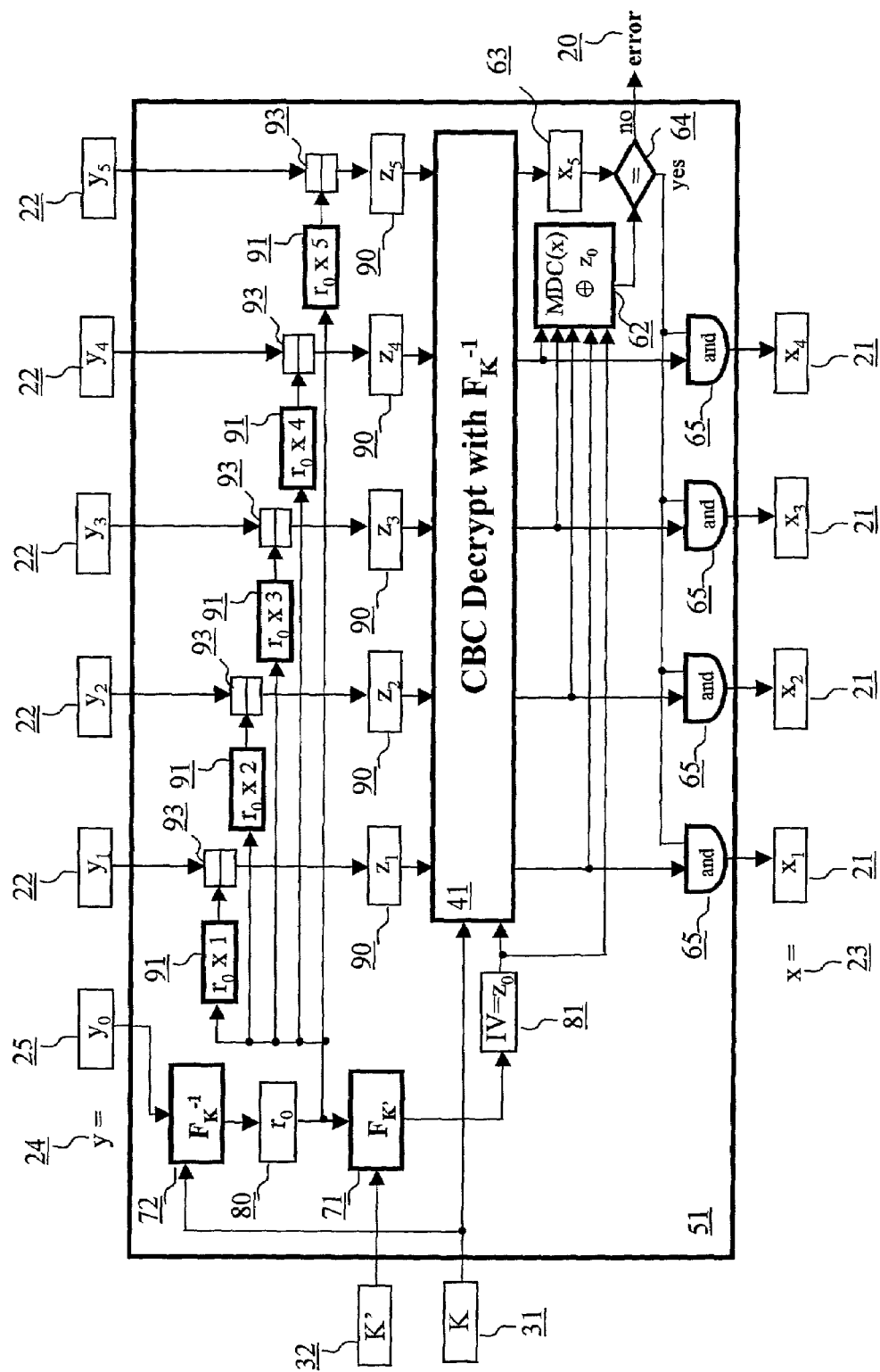
FIG. 8 illustrates a schematic diagram for the preferred embodiment of this invention of the stateless decryption scheme in which input ciphertext string $y=y_0\ y_1\ y_2\ y_3\ y_4\ y_5$ is decrypted to obtain output plaintext string $x=x_1\ x_2\ x_3\ x_4$ or the error indicator.

FIG. 8 illustrates a schematic diagram for the preferred embodiment of this invention of the stateless decryption. From the ciphertext string y 24, ciphertext block $y_0$ 25 is deciphered using the inverse of the block cipher with the first key K 31, namely $F^{-1}_K$ 72 to obtain the secret random vector $r_0$ 80. The secret random vector $r_0$ 80 is further enciphered by $F_{K'}$ 71, the block cipher F using the second key K' 32, to obtain the secret random vector $z_0$ 81.

The secret random number $r_0$ 80 is used to obtain the unpredictable elements $r_0 \times i$ (modulo $2^l$) 91 in the same way as at encryption (viz., FIG. 7). These unpredictable elements $r_0 \times i$ 91 and the ciphertext blocks $y_i$ 22 are combined using the subtraction modulo $2^l$ operation 93 (the inverse of that used at encryption) to yield n+1 hidden ciphertext blocks $z_i$ 90; i.e., $z_i = y_i - r_0 \times i$ for any $i=1, \ldots, n+1$. The invention, however, is not so limited, as other inverse combination operations may also be used for operation 93, the only restriction being that operation 93 is the inverse of the combination operation 92.

The n+1 hidden ciphertext blocks $z_i$ 90 are presented to cipher-block chaining (CBC) decryption 41 that uses as $IV=z_0$ 81 and $F^{-1}_K$, the inverse of the block cipher F using the first key K 31; cipher-block chaining (CBC) decryption 41 is described in detail in FIG. 6. Cipher-block chaining (CBC) decryption 41 returns n+1 blocks $x_i$. The last block $x_{n+1}$ 63 represents the decrypted MDC block. The other n blocks $x_i$, namely $x_1, x_2, \ldots, x_n$, in accordance with one embodiment of the MDC function, are bit-wise exclusive-or-ed with the secret random vector $z_0$ 81 to obtain computed $MDC(x) \oplus z_0$ 62; i.e. $MDC(x) \oplus z_0 = x_1 \oplus \ldots \oplus x_n \oplus z_0$. Then the computed $MDC(x) \oplus z_0$ and the decrypted MDC block $x_{n+1}$ 63 are compared for equality at 64. If the computed MDC block $MDC(x) \oplus z_0$ 62 and the decrypted MDC block 63 are not equal then the result of the decryption of the data string y 24 is the error indicator 20. If the computed MDC block $MDC(x) \oplus z_0$ 62 and the decrypted MDC block 63 are equal then the output from the logical "and" operators 65 is the result of the decryption of the ciphertext string y 24 using the decryption scheme 51; i.e., the result is the plaintext string x 23 composed of n plaintext blocks $x_i$ 21. For the example illustrated in FIG. 8, the output of the decryption scheme 51 is the plaintext string $x=x_1\ x_2\ x_3\ x_4$.

Figure 9:
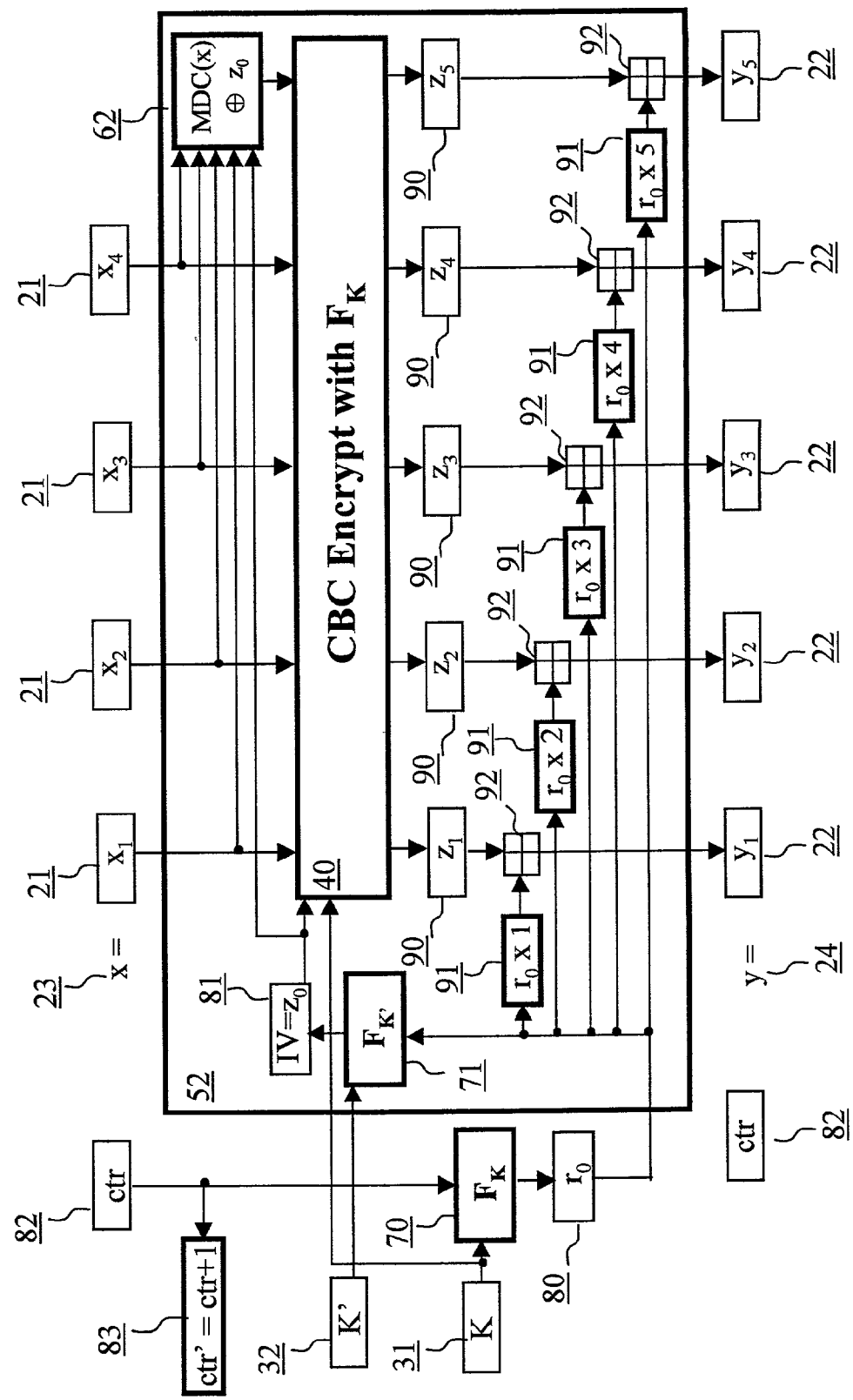
FIG. 9 illustrates a schematic diagram for the preferred embodiment of this invention of the stateful encryption scheme in which input plaintext $x=x_1\ x_2\ x_3\ x_4$ is encrypted using keys K and K' to obtain output ciphertext string $y=y_1\ y_2\ y_3\ y_4\ y_5$ based on cipher-block chaining (CBC).

FIG. 9 illustrates a schematic diagram for the preferred embodiment of this invention of the stateful encryption scheme. The encryption scheme 52 uses a pair of secret keys K and K' (i.e., a first key K 31, and a second key K' 32). In this embodiment of the method of the invention a counter ctr 82 is enciphered using $F_K$ 70, the block cipher F using the first key K 31, to yield the secret random number $r_0$ 80. The secret random number $r_0$ is also enciphered with $F_{K'}$ 71, the block cipher F using the second key K' 32, to yield the secret random vector $IV=z_0$ 81.

The plaintext blocks $x_i$ 21 and the secret random vector $z_0$ 81 are bit-wise exclusive-or-ed into $MDC(x) \oplus z_0$ 62; i.e., $MDC(x) \oplus z_0 = x_1 \oplus \ldots \oplus x_n \oplus z_0$, and this value is appended to the plaintext string x and submitted to the cipher-block chaining encryption scheme 40. The cipher-block chaining encryption scheme 40 uses $F_K$, the cipher block F using the first key K 31, and as initialization vector $IV=z_0$ 81. The detailed operation of the cipher-block chaining scheme 40 are provided in FIG. 5. In this embodiment, the cipher-block chaining scheme 40 outputs n+1 hidden ciphertext blocks $z_i$ 90. FIG. 9 shows an example where n=4; i.e. the hidden ciphertext blocks 90 are $z_1, z_2, z_3, z_4, z_5$.

In the preferred embodiment of this invention of the stateful encryption scheme, the hidden ciphertext blocks 90 are submitted to a randomization step comprising applying a combination operation 92 to each hidden ciphertext block $z_i$ 90 and each l-bit element 91 of a sequence of n+1 elements. Each of these elements 91 is unpredictable because it is obtained by combining the secret random number $r_0$ 80 and the element identifier i such that for any given l-bit constant a, the probability of the event $r_0 \times i = a$ is negligible, wherein the notion of negligible probability is well-known to those skilled in the art (viz., M. Naor and O. Reingold: "From Unpredictability to Indistinguishability: A Simple Construction of Pseudo-Random Functions from MACs," Advances in Cryptology—CRYPTO '98 (LNCS 1462), pp. 267–282, 1998; M. Bellare, A. Desai, E. Jokipii, and P. Rogaway: "A Concrete Security treatment of Symmetric Encryption," Proceedings of the 38th Symposium on Foundations of Computer Science, IEEE, 1997, pp. 394–403). In the preferred embodiment of this invention, each unpredictable element 91 is obtained my multiplication modulo $2^l$ of the element index i and the secret random number $r_0$ 80. In the preferred embodiment of this invention for sequential block encryption, each element $r_0 \times (i+1)$ of the sequence of unpredictable elements (where $i \geq 1$) is generated from the previous element $r_0 \times i$ by modular $2^l$ addition of the secret random number $r_0$, the first element of the sequence being the random number $r_0$ itself. It should be appreciated by those skilled in the art, and is a further aspect of this invention, that the unpredictable elements 91 and the combination operation 92 can be obtained in other ways that do not depart from the spirit and scope of the present invention as set forth in the claims. In an alternate embodiment of this invention, the unpredictable elements 91 are the elements of the linear congruence sequence defined by $a^i \times r_0$, where a is called the multiplier and is chosen to pass all the necessary spectral tests, i is the element index, $i=1, \ldots, n+1$, and $r_0$ is the secret random number 80, as described by D. E. Knuth in "The Art of Computer Programming—Volume 2: Seminumerical Algorithms," Addison-Wesley, 1981 (second edition), Chapter 3, incorporated herein by reference.

The combination operation 92 is an operation that has an inverse. In the preferred embodiment of this invention, the combination operation 92 is the modular $2^l$ addition, whereby each ciphertext block is obtained as $y_i = z_i + r_0 \times i$ modulo $2^l$. In an alternate embodiment of this invention, the combination operation 92 is the bit-wise exclusive-or operation. In yet another alternate embodiment of this invention, the combination operation 92 is modular $2^l$ subtraction operation. The invention, however, is not so limited, as other combination operations that have an inverse may also be used for operation 92.

The application of the combination operation 92 to the plurality of hidden ciphertext blocks 90 and the unpredictable elements 91 of the sequence results in a plurality of ciphertext blocks 22. The plurality of ciphertext blocks 22 forms the ciphertext string y 24 that has n+1 blocks. For the example presented in FIG. 9, the ciphertext string 24 is $y=y_1\ y_2\ y_3\ y_4\ y_5$; i.e., has n+1=5 blocks. The counter ctr 82 and the ciphertext string y 24 representing the output of the encryption scheme 52 form the output message data.

With the encryption of each plaintext string, the current value of the counter ctr is incremented, or otherwise changed to a new value, at 83. This new value is used to encrypt the next plaintext string.

Figure 10:
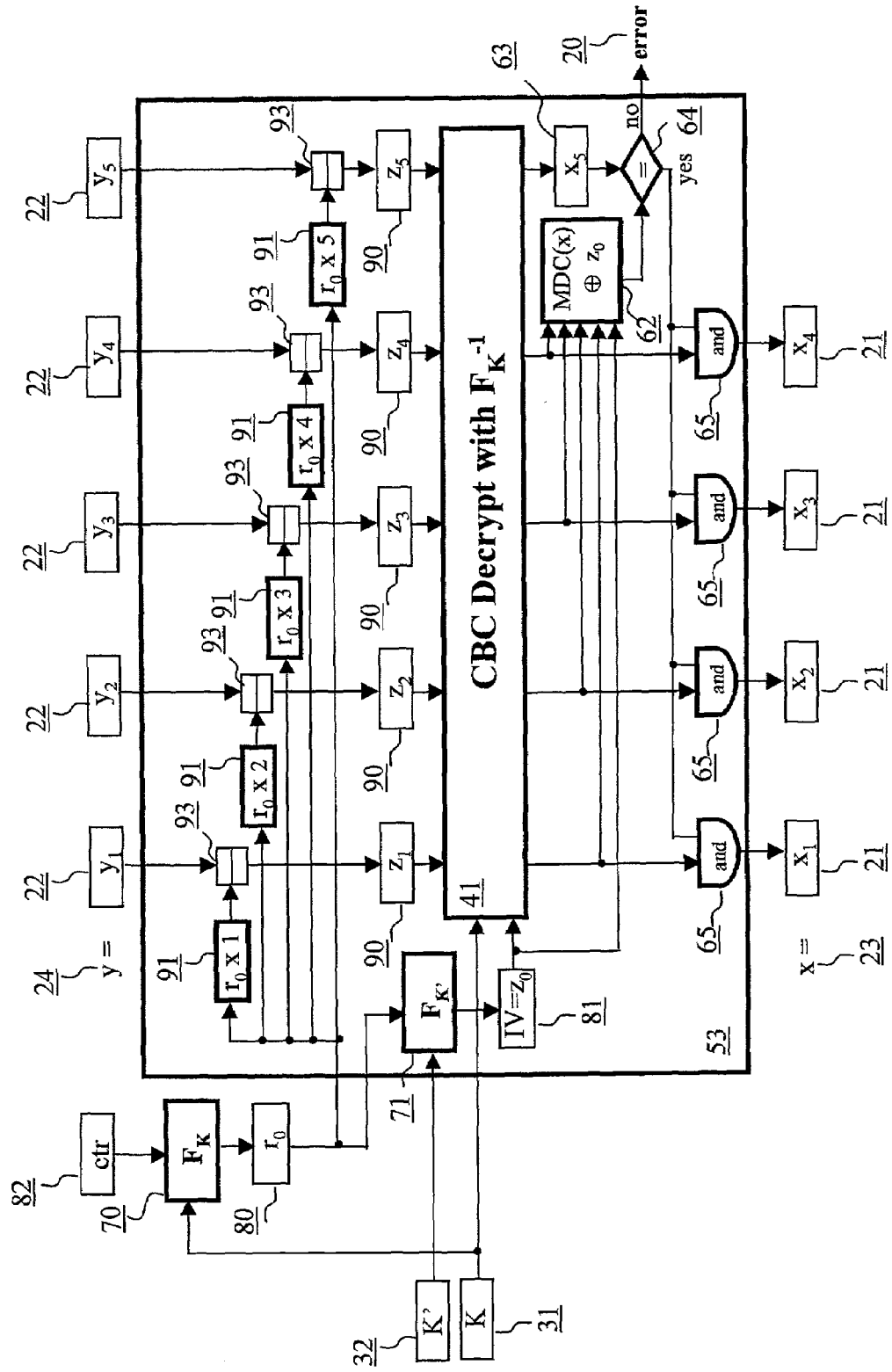
FIG. 10 illustrates a schematic diagram for the preferred embodiment of this invention of the stateful decryption scheme in which input ciphertext string $y=y_1\ y_2\ y_3\ y_4\ y_5$ is decrypted to obtain the output plaintext string plaintext $x=x_1\ x_2\ x_3\ x_4$ or the error indicator.

FIG. 10 illustrates a schematic diagram for the preferred embodiment of this invention of the stateful decryption scheme. From the string presented for decryption comprising the counter ctr 82 and ciphertext string y 24, the counter ctr 82 is enciphered using $F_K$ 70, the block cipher F using the first key K 31, and the secret random number $r_0$ 80 is obtained. Given the secret random number $r_0$ 80, the ciphertext string y 24, composed of n+1 ciphertext blocks $y_i$ 22, is decrypted by the decryption scheme 53 as in FIG. 8 to obtain either the plaintext string x 23 composed of n plaintext blocks $x_i$ 21 or the error indicator 20.

Figure 11:
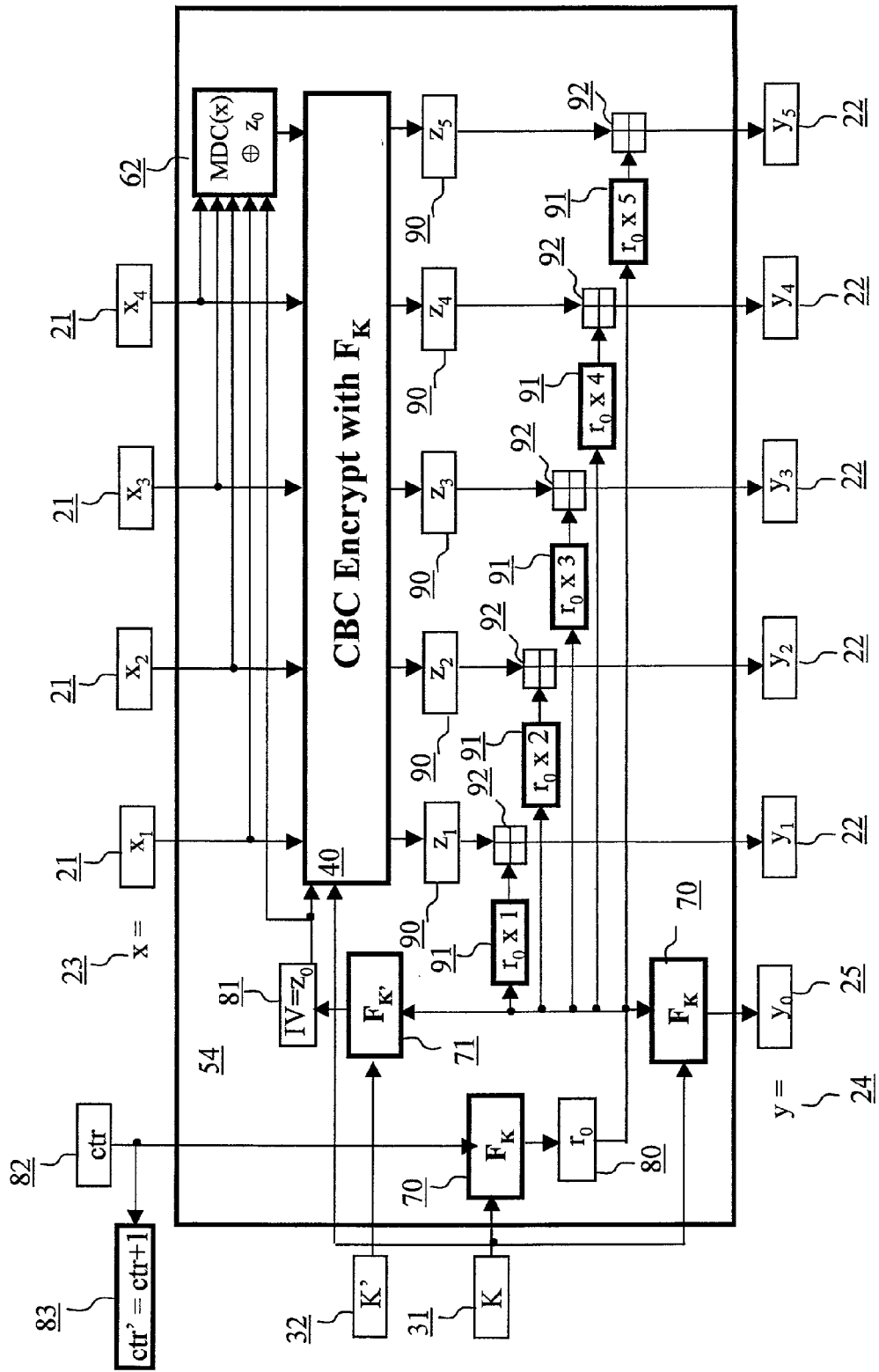
FIG. 11 illustrates a schematic diagram for an alternate embodiment of this invention of the stateful encryption scheme in which input plaintext string plaintext $x=x_1\ x_2\ x_3\ x_4$ is encrypted using keys K and K' to obtain output ciphertext $y=y_0\ y_1\ y_2\ y_3\ y_4\ y_5$ based on cipher-block chaining (CBC).

FIG. 11 illustrates a schematic diagram for an alternate embodiment of this invention of the stateful encryption scheme. The encryption scheme 54 uses a pair of secret keys K and K' (i.e., a first key K 31, and a second key K' 32). In this alternate stateful embodiment of the method of the invention a counter ctr 82 is enciphered using $F_K$ 70, the block cipher F using the first key K 31, to yield the secret random number $r_0$ 80. Furthermore, the secret random number $r_0$ 80 is enciphered with $F_K$ 70, the block cipher F using key K 31, to yield the ciphertext block $y_0$ 25. The secret random number $r_0$ is also enciphered with $F_{K'}$ 71, the block cipher F using the second key K' 32, to yield the secret random vector IV=$z_0$ 81.

The plaintext blocks $x_i$ 21 and the secret random vector $z_0$ 81 are bit-wise exclusive-or-ed into MDC(x)⊕$z_0$ 62; i.e., MDC(x)⊕$z_0$=$x_1$⊕ ... ⊕$x_n$⊕$z_0$, and this value is appended to the plaintext string x and submitted to the cipher-block chaining encryption scheme 40.

The cipher-block chaining encryption scheme 40 uses $F_K$, the block cipher F using the secret first key K 31, and as initialization vector IV=$z_0$ 81. The details about the implementation of cipher-block chaining (CBC) 40 are provided in FIG. 5. Cipher-block chaining (CBC) 40 outputs n+1 hidden ciphertext blocks $z_i$ 90. FIG. 11 shows an example where n=4; i.e. the hidden ciphertext blocks 90 are $z_1$, $z_2$, $z_3$, $z_4$, $z_5$.

In this alternate embodiment of the stateful encryption scheme, the hidden ciphertext blocks 90 are submitted to a randomization step comprising applying a combination operation 92 to each hidden ciphertext block $z_i$ 90 and each l-bit element 91 of a sequence of n+1 elements. Each of these elements 91 is unpredictable because it is obtained by combining the secret random number $r_0$ 80 and the element identifier i such that for any given l-bit constant a, the probability of the event $r_0 \times i = a$ is negligible, wherein the notion of negligible probability is well-known to those skilled in the art (viz., M. Naor and O. Reingold: "From Unpredictability to Indistinguishability: A Simple Construction of Pseudo-Random Functions from MACs," Advances in Cryptology—CRYPTO '98 (LNCS 1462), pp. 267–282, 1998; M. Bellare, A. Desai, E. Jokipii, and P. Rogaway: "A Concrete Security Treatment of Symmetric Encryption," Proceedings of the 38th Symposium on Foundations of Computer Science, IEEE, 1997, pp. 394–403). In this alternate embodiment, each unpredictable element 91 is obtained my multiplication modulo $2^l$ of the element index i with the secret random number $r_0$ 80. In this alternate embodiment, when encryption is performed sequentially, each element $r_0 \times (i+1)$ of the sequence of unpredictable elements (where $i \geq 1$) is generated from the previous element $r_0 \times i$ by modular $2^l$ addition of the secret random number $r_0$, the first element of the sequence being the random number $r_0$ itself. It should be appreciated by those skilled in the art, and is a further aspect of this invention, that the unpredictable elements 91 and the combination operation 92 can be obtained in other ways that do not depart from the spirit and scope of the present invention as set forth in the claims. In yet another alternate embodiment of this invention, the unpredictable elements 91 are the elements of the linear congruence sequence defined by $a^i \times r_0$, where a is called the multiplier and is chosen to pass all the necessary spectral tests, i is the element index, i=1, ..., n+1, and $r_0$ is the secret random number 80, as described by D. E. Knuth in "The Art of Computer Programming—Volume 2: Seminumerical Algorithms," Addison-Wesley, 1981 (second edition), Chapter 3, incorporated herein by reference.

In this alternate embodiment of this invention of the stateful encryption, the combination operation 92 is the modular $2^l$ addition, whereby each ciphertext block is obtained as $y_i = z_i + r_0 \times i$ modulo $2^l$. In yet another alternate embodiment of this invention, the combination operation 92 is the bit-wise exclusive-or operation. In yet another alternate implementation, the combination operation 92 is the modular $2^l$ subtraction operation. The invention, however, is not so limited, as other combination operations that have an inverse may also be used for operation 92.

The application of the combination operation 92 to the plurality of hidden ciphertext blocks 90 and the unpredictable elements 91 of the sequence results in a plurality of ciphertext blocks 22. Ciphertext block $y_0$ 25 and the plurality of ciphertext blocks 22 form the ciphertext string y 24 that has n+2 blocks and is the output data of the encryption scheme 54. For the example presented in FIG. 11, the ciphertext string 24 is y=$y_0$ $y_1$ $y_2$ $y_3$ $y_4$ $y_5$; i.e., has n+2=6 blocks.

Figure 12:
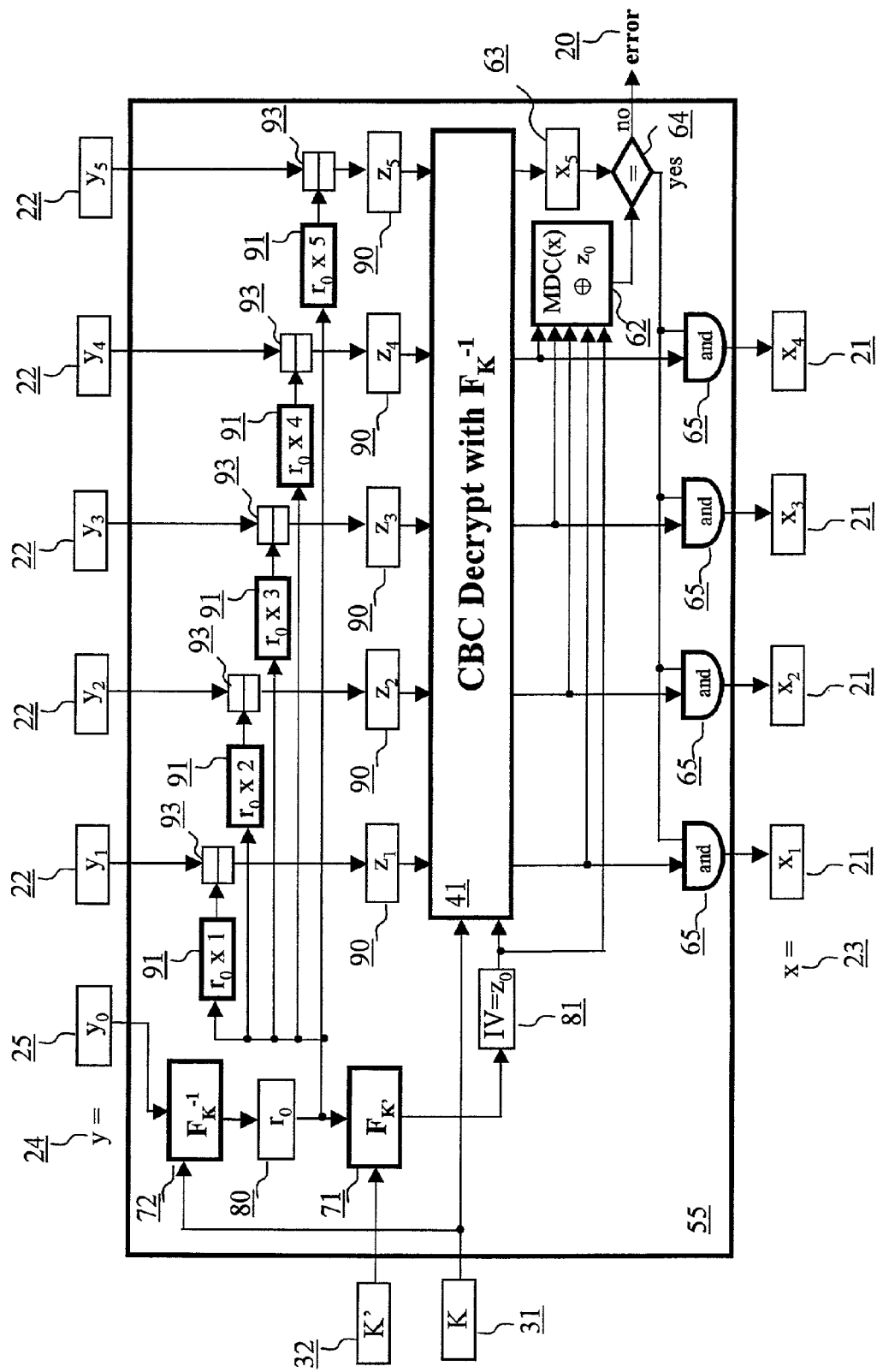
FIG. 12 illustrates a schematic diagram for the alternate embodiment of this invention of the stateful decryption scheme in which input ciphertext string $y=y_0\ y_1\ y_2\ y_3\ y_4\ y_5$ is decrypted to obtain output plaintext string $x=x_1\ x_2\ x_3\ x_4$ or the error indicator.

FIG. 12 illustrates a schematic diagram for the alternate embodiment of this invention of the stateful decryption scheme. The decryption of the ciphertext string y 24 composed of the ciphertext block $y_0$ 25 and the n+1 ciphertext blocks $y_i$ 22 is done by the decryption scheme 55 in exactly the same way as in FIG. 8.

Figure 13:
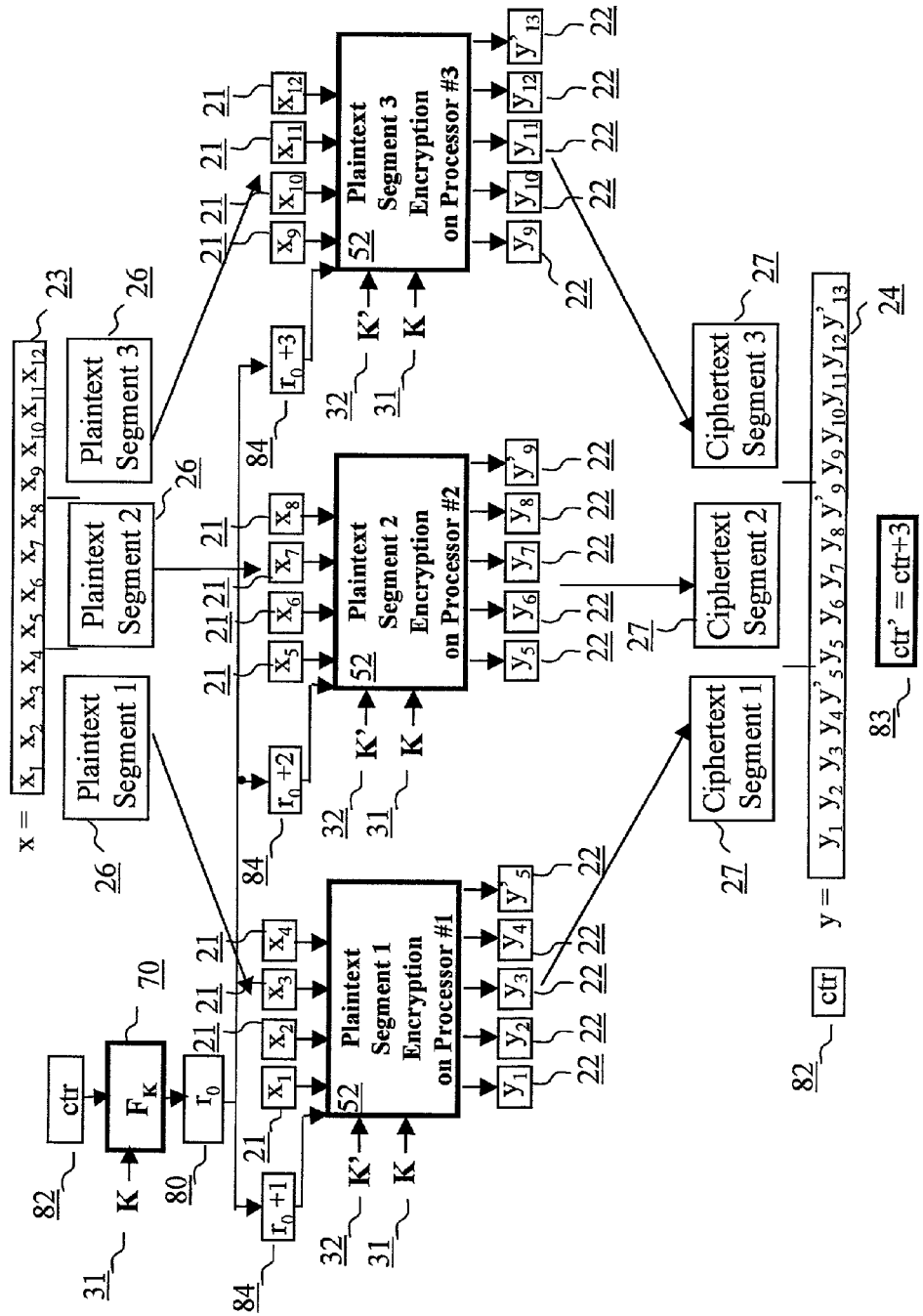
FIG. 13 illustrates a schematic diagram for the preferred embodiment of the 3-processor stateful parallel encryption scheme in which input plaintext string $x=x_1\ x_2\ x_3\ x_4\ x_5\ x_6\ x_7\ x_8\ x_9\ x_{10}\ x_{11}\ x_{12}$ is encrypted using keys K and K' to obtain output ciphertext string $y=y_1\ y_2\ y_3\ y_4\ y'_5\ y_5\ y_6\ y_7\ y_8\ y'_9\ y_9\ y_{10}\ y_{11}\ y_{12}\ y'_{13}$.

FIG. 13 illustrates a schematic diagram for the preferred embodiment of the L-processor stateful parallel encryption scheme. Input plaintext string x 23 composed of n plaintext blocks $x_i$ 21 is encrypted using a pair of secret keys K 31 and K' 32 to obtain output ciphertext string y 24 composed of ciphertext blocks $y_i$ 22. The plaintext string x 23 (which is padded in a standard way) is partitioned into a plurality of plaintext segments 26, such that the number of segments is equal to the number of processors L. Each plaintext segment contains a plurality of plaintext blocks $x_i$ 21. FIG. 13 shows an example in which the number of processors is L=3, and the plaintext string x 23 has 12 plaintext blocks $x_1$ $x_2$ $x_3$ $x_4$ $x_5$ $x_6$ $x_7$ $x_8$ $x_9$ $x_{10}$ $x_{11}$ $x_{12}$; furthermore, plaintext segment 1 is composed of plaintext blocks $x_1$ $x_2$ $x_3$ $x_4$, plaintext segment 2 is composed of plaintext blocks $x_5$ $x_6$ $x_7$ $x_8$, and plaintext segment 3 is composed of plaintext blocks $x_9$ $x_{10}$ $x_{11}$ $x_{12}$. Note that although in the example presented in FIG. 13, the plaintext segments 26 have the same number of plaintext blocks 21, this is not required.

A counter ctr 82 is enciphered using $F_K$ 70, the block cipher F using the first key K 31, to yield the secret random number $r_0$ 80. From the secret random number $r_0$ 80, different secret random numbers 84 are generated for each plaintext segment 26. Each plaintext segment 26 is encrypted using the encryption scheme 52 (viz., FIG. 9), using the secret random number generated at 84 and the secret keys K 31 and K' 32 to obtain a plurality of ciphertext blocks 22.

The plurality of ciphertext blocks 22 for each processor segments are combined into a ciphertext segment 27. The ciphertext segments 27 are further assembled together with the number of ciphertext segments L, the length of each ciphertext segment and the ciphertext segment sequence into the ciphertext string y 24. The ciphertext string y 24 contains n+L ciphertext blocks. FIG. 13 shows an example in which plaintext segment 1 is encrypted using the encryption scheme 52, the secret random number $r_0+1$ generated at 84, the secret keys K 31 and K' 32 to obtain the ciphertext blocks $y_1\ y_2\ y_3\ y_4\ y'_5$; plaintext segment 2 is encrypted using the encryption scheme 52, the secret random number $r_0+2$ generated at 84, the secret keys K 31 and K' 32 to obtain the ciphertext blocks $y_5\ y_6\ y_7\ y_8\ y'_9$; and plaintext segment 3 is encrypted using the encryption scheme 52, the secret random number $r_0+3$ generated at 84, the secret keys K 31 and K' 32 to obtain the ciphertext blocks $y_9\ y_{10}\ y_{11}\ y_{12}\ y'_{13}$. In the example presented in FIG. 13, the ciphertext string 24 is $y=y_1\ y_2\ y_3\ y_4\ y'_5\ y_5\ y_6\ y_7\ y_8\ y'_9\ y_9\ y_{10}\ y_{11}\ y_{12}\ y'_{13}$ and contains n+L=12+3=15 ciphertext blocks.

With the encryption of each plaintext string, the current value of the counter ctr is incremented with the number of plaintext segments L, or otherwise changed to a new value, at 83. This new value is used to encrypt the next plaintext string.

Figure 14:
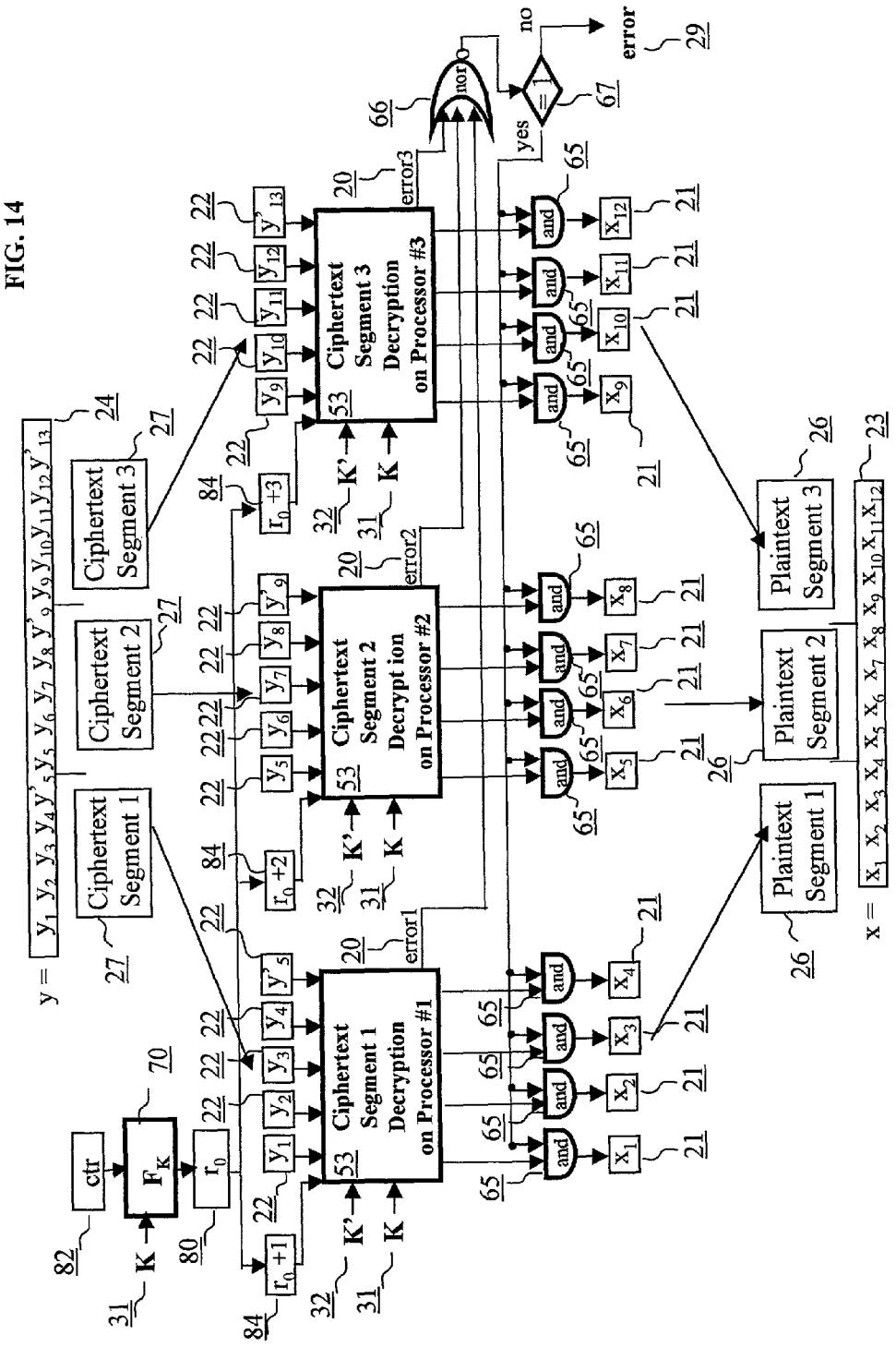
FIG. 14 illustrates a schematic diagram for the preferred embodiment of the 3-processor stateful parallel decryption scheme in which input ciphertext string $y=y_1\ y_2\ y_3\ y_4\ y'_5\ y_5\ y_6\ y_7\ y_8\ y'_9\ y_9\ y_{10}\ y_{11}\ y_{12}\ y'_{13}$ is decrypted to obtain output plaintext $x=x_1\ x_2\ x_3\ x_4\ x_5\ x_6\ x_7\ x_8\ x_9\ x_{10}\ x_{11}\ x_{12}$ or the error indicator.

FIG. 14 illustrates a schematic diagram for the preferred embodiment of the L-processor stateful parallel decryption scheme. Input ciphertext string y 24 is decrypted to obtain output plaintext x 23 or the failure indicator 29. The parsing of the ciphertext string y yields the number of ciphertext segments L, the length of each ciphertext segment and the ciphertext segment sequence; furthermore, the ciphertext string y 24 is partitioned into a plurality of ciphertext segments 27, such that the number of segments is equal to the number of processors L. Each segment contains a plurality of ciphertext blocks $y_i$ 22. FIG. 14 shows an example in which the number of processors is L=3, the ciphertext string y 24 has 15 ciphertext blocks $y_1\ y_2\ y_3\ y_4\ y'_5\ y_5\ y_6\ y_7\ y_8\ y'_9\ y_9\ y_{10}\ y_{11}\ y_{12}\ y'_{13}$ and the number of processors is 3; furthermore, ciphertext segment 1 is composed of ciphertext blocks $y_1\ y_2\ y_3\ y_4\ y'_5$, ciphertext segment 2 is composed of ciphertext blocks $y_5\ y_6\ y_7\ y_8\ y'_9$, and ciphertext segment 3 is composed of ciphertext blocks $y_9\ y_{10}\ y_{11}\ y_{12}\ y'_{13}$. Note that although in the example presented in FIG. 14, the ciphertext segments 27 have the same number of ciphertext blocks 22, this is not required.

A counter ctr 82 is enciphered using $F_K$ 70, the block cipher F using the first key K 31, to yield the secret random number $r_0$ 80. From the secret random number $r_0$ 80, different secret random numbers are generated at 84 for each ciphertext segment 27 in the same manner as that used at the encryption. Each ciphertext segment 27 is decrypted using the decryption scheme 53 (viz., FIG. 10), using the secret random number generated at 84 and the secret keys K 31 and K' 32 to obtain a plurality of plaintext blocks 21 or the error indicators 20. The pluralities of plaintext blocks 21 are combined into plaintext segments 26, and the plurality of the plaintext segments 26 are combined into the plaintext string x 22. FIG. 14 shows an example in which ciphertext segment 1 is decrypted using the decryption scheme 53, the secret random number $r_0+1$ generated at 84, the secret keys K 31 and K' 32 to obtain the plaintext blocks $x_1\ x_2\ x_3\ x_4$ or an error indicator error1; ciphertext segment 2 is decrypted using the decryption scheme 53, the secret random number $r_0+2$ generated at 84, the secret keys K 31 and K' 32 to obtain the plaintext blocks $x_5\ x_6\ x_7\ x_8$ or an error indicator error2; and ciphertext segment 3 is decrypted using the decryption scheme 53, the secret random number $r_0+3$ generated at 84, the secret keys K 31 and K' 32 to obtain the plaintext blocks $x_9\ x_{10}\ x_{11}\ x_{12}$ or an error indicator error3. The error indicators 20 are further input to a logical "nor" gate 66 to determine whether any error occurred. If no error occurred, then the output of the logical "nor" gate 66 indicates a "1". The output of the "nor" gate 66 is "0" if at least one error occurred. Furthermore, comparator 67 verifies whether the output of the "nor" gate 66 is "0", in which case it outputs the error indicator 29. If the output of the "nor" gate 66 is "1", the logical "and" operators 65 output a plurality of plaintext blocks $x_i$ 21 that is the result of the decryption of the ciphertext blocks $y_i$ 22 using the decryption scheme 53. The logical "and" operators 65 allow the output of plaintext blocks $x_i$ only if the output of the comparator 67 is "yes". For each processor, the plurality of plaintext blocks 21 are combined into a plaintext segment 26, and the plurality of plaintext segments 26 are further combined into the plaintext string x 23. In the example of FIG. 14, the plaintext string $x=x_1\ x_2\ x_3\ x_4\ x_5\ x_6\ x_7\ x_8\ x_9\ x_{10}\ x_{11}\ y_{12}$.

The present invention in the preferred embodiment for the L-processor parallel scheme for the decryption of the input ciphertext string y 24, inherently includes the detection of out-of-sequence ciphertext segments and ciphertext segment length modifications, and length of the ciphertext string modifications, in which case the error message is output.

Additional details of the embodiment of the method of the present invention are now presented. The encryption schemes presented in this method process plaintext strings whether or not they are multiple of a desired block length L. The method begins by selecting F, an l-bit block cipher using keys of length k. For example, L is 64 and k=56 when F is the DES algorithm. Of course, other block ciphers (including, but not limited to IDEA, AES) besides DES can also be used.

In FIGS. 1–2 and 7–12, the secret random vector $IV=z_0$ is computed by enciphering the secret random number $r_0$ with a second key K'. In an alternate embodiment of this invention, the secret random vector $z_0$ is obtained by enciphering a variant of $r_0$ using the first key K, e.g., $z_0=F_K(r_0+c)$ where c is a constant. Yet other embodiments of this invention can provide means for generating the random vector $z_0$ wherein $z_0$ is secret, random and independent of $r_0$.

It should be appreciated by those skilled in the art that the specific embodiments disclosed above may be readily utilized as a basis for modifying or designing other techniques and routines for carrying out the same purposes and spirit of the present invention as set forth in the claims.

The foregoing description of a preferred embodiment of the invention has been presented for purposes of illustration and description. It is not intended to be exhaustive or to limit the invention to the precise form disclosed, and modifications and variations are possible in light of the above teachings or maybe acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined the claims appended hereto, and their equivalents.

We claim:

1. An encryption method for providing both data confidentiality and integrity for a message, comprising the steps of:

receiving an input plaintext string comprising a message and padding it as necessary such that its length is a multiple of l bits;

partitioning the input plaintext string a length that is a multiple of l bits into a plurality of equal-size blocks of l bits in length;

creating an a Manipulation Detection Code (MDC) block of l bits in length that includes the result of applying a non-cryptographic MDC function to the plurality of the equal-size blocks;

making one and only one processing pass with a single cryptographic primitive over each of said equal-size blocks and the MDC block to create a plurality of hidden ciphertext blocks each of l bits in length; and performing a randomization function over said plurality of hidden ciphertext blocks to create a plurality of output ciphertext blocks each of l bits in length.

2. The method as defined in claim 1, comprising the steps of:

wherein said making one and only one processing pass step comprises processing each of said equal-size blocks and the MDC block by an encryption scheme that is confidentiality-secure against chosen-plaintext attacks, wherein each of said equal-size blocks and the MDC block is processed by a block cipher using a first secret key to obtain said plurality of hidden ciphertext blocks; and wherein said performing a randomization function step comprises combining each of said hidden ciphertext blocks with a corresponding element of a sequence of unpredictable elements to create a set of output blocks of the ciphertext, wherein a hidden ciphertext block identified by an index i is combined with the element of the sequence identified by index i by an operation that has an inverse.

3. The method as defined in claim 2, wherein said creating an MDC block step comprises:

applying the non-cryptographic MDC function to the partitioned plaintext blocks; and combining the result with a secret, l-bit random vector generated on a per-message basis to obtain said MDC block.

4. The method as defined in claim 3, wherein said combining step comprises performing the combination using a bit-wise exclusive-or function.

5. The method as defined in claim 3, comprising the step of generating said secret random vector from a secret random number generated on a per-message basis.

6. The method as defined in claim 2, further comprising the step of appending the created MDC block after a last block of the set of equal-sized blocks comprising the padded plaintext string.

7. The method as defined in claim 3, wherein said encryption scheme is cipher block chaining (CBC); and further comprising the step of representing an initialization vector for the CBC as the secret random vector.

8. The method as defined in claim 2, wherein the hidden ciphertext blocks from the processing step comprise n+1 hidden ciphertext blocks each of l-bit length, where n is the total number of blocks in said set of equal-sized blocks of the padded input plaintext string.

9. The method as defined in claim 2, further comprising the step of generating each of a plurality of the unpredictable elements of said sequence of unpredictable elements by combining a different element identifier for each of the unpredictable elements and a secret random number.

10. The method as defined in claim 5, further comprising the step of generating each of a plurality of the unpredictable elements of said sequence of unpredictable elements by combining a different element identifier for each of the unpredictable elements and said secret random number.

11. The method as defined in claim 5, further comprising the steps of:

enciphering the secret random number using the block cipher using the secret first key; and including this enciphered secret random number as one of said output ciphertext blocks.

12. The method of claim 3, wherein said secret random vector is generated by enciphering a secret random number of l-bits in length, said enciphering using said block cipher using a secret second key.

13. The method as defined in claim 5, wherein said secret random vector is generated by enciphering a variant of said secret random number of l-bits in length, said enciphering using said block cipher using said secret first key.

14. The method as defined in claim 13, wherein said variant of said secret random number is obtained by adding a constant to said secret random number.

15. The method of claim 5, wherein the secret random number is provided by a random number generator.

16. The method as defined in claim 5, further comprising:

generating said secret random number by enciphering a count of a counter initialized to a constant, said enciphering being performed with the block cipher using the secret first key; and incrementing said counter by one on every message encryption.

17. The method as defined in claim 16, wherein said counter is initialized to a constant whose value is the l-bit representation of negative one.

18. The method as defined in claim 16, comprising:

initializing said counter to a secret value of l-bits in length.

19. The method as defined in claim 16, further comprising:

outputting said counter value as an output block of the encryption scheme.

20. The method as defined in claim 5, further comprising:

sharing the secret random number between a sender and a receiver.

21. The method as defined in claim 1, wherein said non-cryptographic MDC function is a bit-wise exclusive-or function.

22. The method as defined in claim 2, wherein said encryption scheme is the CBC scheme of encryption.

23. The method as defined in claim 2, wherein said operation that has an inverse is the addition modulo $2^l$.

24. The method as defined in claim 2, wherein said operation that has an inverse is a bit-wise exclusive-or operation.

25. The method as defined in claim 2, wherein said operation that has an inverse is the subtraction modulo $2^l$ operation.

26. The method as defined in claim 3, further comprising:

generating said secret random vector from a secret random number of l-bit length; and generating each element in said sequence of unpredictable elements by modular $2^l$ multiplication of a different unique element identifier (i) for each element in the sequence of unpredictable elements and said secret random number.

27. The method as defined in claim 3, further comprising:
generating said secret random vector from a secret random number of l-bit length; and
generating each element in said sequence of unpredictable elements from the previous element by modular $2^l$ addition of said secret random number to the previous element, with a first element of said sequence being said secret random number itself.

28. A decryption method that is the inverse of an encryption method which provides both data confidentiality and integrity, comprising the steps of:
presenting a string including ciphertext string for decryption;
partitioning said ciphertext string into a plurality of ciphertext blocks comprising l-bits each;
selecting n+1 ciphertext blocks from said plurality of ciphertext blocks representing n data blocks and one Manipulation Detection Code MDC block and performing a reverse randomization function on each of the selected n+1 ciphertext blocks to obtain a plurality of hidden ciphertext blocks each of l-bits in length;
making one and only one processing pass with a single cryptographic primitive that is the inverse of an encryption single cryptographic primitive over the plurality of hidden ciphertext blocks to obtain a plurality of plaintext blocks comprising l-bits each;
verifying integrity of the plaintext blocks using a non-cryptographic MDC function;
outputting the plurality of plaintext blocks as an accurate plaintext string if the integrity verification passes; and
outputting a failure indicator if the integrity verification fails.

29. The method as defined in claim 28, wherein performing said reverse randomization function comprises:
deriving a secret random number from said ciphertext string presented for decryption;
generating a sequence of unpredictable elements each of l-bit length from said secret random number in a same manner as used at the encryption method;
selecting n+1 ciphertext blocks from said plurality of ciphertext blocks representing n data blocks and one MDC block in a same order as that used at the encryption method, and combining said selected ciphertext blocks with said sequence of unpredictable elements to obtain a plurality of hidden ciphertext blocks, such that each of the n+1 ciphertext blocks identified by index i is combined with the element of the sequence of unpredictable elements identified by index i, by the inverse of an operation used at the encryption method;
wherein the step of making one and only one processing pass comprises decrypting the plurality of hidden ciphertext blocks with the inverse of the block cipher used at an encryption method with a first secret key (K), the result of the decryption being a plurality of n decrypted plaintext data blocks and one decrypted MDC block each of l-bit length; and
wherein the verifying integrity step comprises creating a MDC decryption block by applying the non-cryptographic function to the n decrypted plaintext data blocks and combining the result with a secret, l-bit random vector, said combining operation being the same as a combining operation at the encryption method, and said secret random vector being derived from said secret random number in the same manner as at the encryption method; and comparing said created MDC decryption block with the decrypted MDC block.

30. The method of claim 28, further comprising:
selecting the ciphertext block of a secret random number from said string presented for decryption; and
deciphering the selected ciphertext block to obtain the secret random number.

31. The method as defined in claim 30, wherein said deciphering step comprises performing the deciphering with the inverse of the said block cipher using the secret first key.

32. The method of claim 29, further comprising:
for the encryption method generating a secret random number by enciphering a count of a counter initialized to a constant, said enciphering being performed with the block cipher using the secret first key; and
incrementing said counter by one on every message encryption; and
further comprising for decrypting the ciphertext blocks of the partitioned ciphertext string the steps of:
selecting a counter block representing the count of the counter from said string presented at decryption; and
enciphering said selected counter block to obtain the secret random number.

33. The method as defined in claim 32, wherein the enciphering step comprises performing said enciphering with the block cipher using the secret first key.

34. The method as defined in claim 28, wherein the string presented for decryption is obtained by applying the encryption method that provides both data confidentiality and integrity to an input plaintext string, further comprising:
outputting said input plaintext string.

35. A method for parallel encryption processing of a message comprising the steps of:
partitioning said input plaintext string into a plurality of input plaintext segments;
concurrently presenting each different one of said plurality of input plaintext segments to a different one of a plurality of encryption processors, each of said different processors using a different l-bit secret random number per segment to obtain a ciphertext segment using an encryption method providing both data confidentiality and integrity with a single processing pass over the input plaintext segment and a single cryptographic primitive, and using a non-cryptographic Manipulation Detection Code function, wherein said single cryptographic primitive is a l-bit block cipher using a secret first key;
assembling the plurality of ciphertext segments into a ciphertext string; and
outputting the ciphertext string.

36. The method as defined in claim 35, wherein said assembling step comprises including in the ciphertext string the number of ciphertext segments, a ciphertext segment index, a length of each ciphertext segment and a sequence of ciphertext segments.

37. The method of claim 35, further comprising:
generating said different l-bit secret random number per segment from a secret random number of l-bits in length.

38. The method of claim 37, further comprising:
generating said different secret random number per segment from the secret random number of l-bits by adding modulo $2^l$ a plaintext segment sequence index for that segment to the secret random number.

39. The method of claim 37, further comprising:
generating said secret random number of l-bits in length by a random number generator;
enciphering said secret random number with said block cipher using a first key; and including the enciphered secret random number as an output block of said output ciphertext string.

40. The method of claim 37, further comprising:
generating said secret random number of l-bits in length by enciphering a counter initialized to a constant, said enciphering being done with said block cipher using said first key; and
outputting said counter value as an output block of said output ciphertext string; and
incrementing after every different message encryption said counter by a number equal to a number of plaintext segments in the message.

41. A method for parallel decryption processing of a message comprising the steps of:
presenting a string including the ciphertext string of a message for decryption;
partitioning said ciphertext string into a plurality of ciphertext segments;
concurrently presenting said plurality of ciphertext segments to a plurality of processors;
obtaining a different secret random number per ciphertext segment from a secret random number in the same manner as at a parallel encryption method;
decrypting each ciphertext segment using said different secret random number per ciphertext segment to obtain a plaintext segment, using a decryption method that is the inverse of an encryption method used in the parallel encryption method that provides both data confidentiality and integrity with a single processing pass over the input plaintext segment and a single cryptographic primitive, wherein said single cryptographic primitive is a l-bit block cipher using a secret first key, and using a non-cryptographic Manipulation Detection Code function for verifying integrity of the plaintext blocks of each plaintext segment;
assembling the plurality of plaintext segments into a plaintext string; and
verifying the integrity of the plaintext segments and their sequence and outputting the plaintext string if the integrity verification passes.

42. The method as defined in claim 41, further comprising outputting a failure indicator if the integrity verification fails for at least one segment.

43. The method of claim 41, further comprising:
selecting a ciphertext block of the secret random number from said string presented for decryption;
deciphering the selected ciphertext block to obtain the secret random number.

44. The method as defined in claim 43, performing said deciphering step with the inverse of a block cipher using a secret first key, said block cipher and said secret first key being the same as to those used at the message encryption method using the plurality of processors.

45. The method of claim 41, further comprising:
for the parallel encryption method generating said secret random number of l-bits in length by enciphering a counter initialized to a constant, said enciphering being done with said block cipher using said first key; and
incrementing after every different message encryption said counter by a number equal to a number of plaintext segments in the message; and
further comprising for decryption of the ciphertext segments of the partitioned ciphertext string the steps of:
selecting a counter block holding the count of the counter from said string presented for decryption;
enciphering the selected counter block to obtain said secret random number.

46. The method as defined in claim 45, wherein said enciphering the counter block step comprises enciphering with the block cipher using the same key as that used for encryption using a plurality of processors.

47. An encryption program product for providing both data confidentiality and integrity for a message, comprising: at least one computer-readable medium having computer-readable program code embodied therein or among them if more than one medium, capable of being executed by a computer, comprising:
first code for receiving an input plaintext string comprising a message and padding it as necessary such that its length is a multiple of l-bits;
second code for partitioning the padded input plaintext string into a plurality of equal-size blocks of l-bits in length;
third code for creating a manipulation Detection Code (MDC) block of l-bits in length that includes the result of applying a non-cryptographic MDC function to the plurality of said equal-size blocks;
fourth code for making one and only one processing pass with a single cryptographic primitive over each of the said equal-size blocks and the MDC block to create a plurality of hidden ciphertext blocks each of l-bits in length; and
fifth code for performing a randomization function over said plurality of hidden ciphertext blocks to create a plurality of output ciphertext blocks each of l-bits in length.

48. The program product as defined in claim 47, comprising:
wherein said fourth code for making one and only one processing pass step comprises code for processing each of said equal-size blocks and the MDC block by an encryption scheme that is confidentiality-secure against chosen-plaintext attacks, wherein each of said equal-size blocks and the MDC block is processed by a block cipher using a first secret key (K) to obtain said plurality of hidden ciphertext blocks; and
wherein said fifth code for performing a randomization function comprises code for combining each of said hidden ciphertext blocks with a corresponding element of a sequence of unpredictable elements to create a set of output blocks of the ciphertext, wherein a hidden ciphertext block identified by an index i is combined with the element of the sequence identified by index i by an operation that has an inverse.

49. The program product as defined in claim 48, wherein said third code for creating a MDC block step comprises:
code for applying the non-cryptographic MDC function to the partitioned plaintext blocks; and
code for combining the result with a secret, l-bit random vector generated on a per-message basis to obtain said MDC block.

50. A decryption program product that is the inverse of the encryption program product which provides both data confidentiality and integrity, comprising: at least one computer-readable medium having computer-readable program code embodied therein or among them if more than medium, capable of being executed by a computer, comprising:
first code for presenting a string including ciphertext string for decryption;
second code for partitioning said ciphertext string into a plurality of ciphertext blocks comprising l-bits each;
third code for selecting n+1 ciphertext blocks from said plurality of ciphertext blocks representing n data blocks and one Manipulation Detection Code (MDC) block and performing a reverse randomization function on each of the selected n+1 ciphertext blocks to obtain a plurality of hidden ciphertext blocks each of l-bits in length;

fourth code for making one and only one processing pass with a single cryptographic primitive that is the inverse of an encryption single cryptographic primitive over the plurality of hidden ciphertext block to obtain a plurality of plaintext blocks comprising l-bits each;

fifth code for verifying integrity of the plaintext blocks using a non-cryptographic MDC function; and sixth code for outputting the plurality of plaintext blocks as an accurate plaintext string if the integrity verification passes; and seventh code for outputting a failure indicator if the integrity verification fails.

51. The program product as defined in claim 50, wherein said third code for performing said reverse randomization function comprises:

code for deriving a secret random number from said ciphertext string presented for decryption;

code for generating a sequence of unpredictable elements each of l-bit length from said secret random number in the same manner as used at an encryption program product;

code for selecting n+1 ciphertext blocks from said plurality of ciphertext blocks representing n data blocks and one MDC block in the same order as that used at an encryption program product, and combining said selected ciphertext blocks with said sequence of unpredictable elements to obtain a plurality of hidden ciphertext blocks ($z_i$), such that each of the n+1 ciphertext blocks identified by index i is combined with the element of the sequence of unpredictable elements identified by index i, by the inverse of said operation used at the encryption program product;

wherein said fourth code for making one and only one processing pass comprises code for decrypting the plurality of hidden ciphertext blocks with the inverse of the block cipher used at an encryption program product with a first secret key (K), the result of the decryption being a plurality of n decrypted plaintext data blocks and one decrypted MDC block each of l-bit length; and wherein said fifth code for verifying integrity step comprises code for creating an MDC decryption block by applying the non-cryptographic Manipulation Detection Code function to the n decrypted plaintext data blocks and combining the result with a secret, l-bit random vector, said combining operation being the same as the combining operation at the encryption program product, and said secret random vector being derived from said secret random number in the same manner as at the encryption program product; and comparing said created MDC decryption block with the decrypted MDC block.

52. An encryption system for providing both data confidentiality and integrity for a message, comprising:

at least one processor, and a memory operatively connected thereto, wherein the at least one processor includes therein, or among them if more than one processor, the following components:

a first component for receiving an input plaintext string comprising a message and padding it as necessary such that its length is a multiple of l-bits;

a second component for partitioning the padded input plaintext string into a plurality of equal-size blocks of l-bits in length;

a third component for creating a Manipulation Detection Code (MDC) block of l-bits in length that includes the result of applying a non-cryptographic MDC function to the plurality of said equal-size blocks;

a fourth component for making one and only one processing pass with a single cryptographic primitive over each of the said equal-size blocks and the MDC block to create a plurality of hidden ciphertext blocks each of l-bits in length; and a fifth component for performing a randomization function over said plurality of hidden ciphertext blocks to create a plurality of output ciphertext blocks each of l-bits in length.

53. The system as defined in claim 52, wherein said fourth component for making one and only one processing pass step comprises a component for processing each of said equal-size blocks and the MDC block by an encryption scheme that is confidentiality-secure against chosen-plaintext attacks, wherein each of said equal-size blocks and the MDC block is processed by a block cipher using a first secret key to obtain said plurality of hidden ciphertext blocks; and wherein said fifth component for performing a randomization function comprises a component for combining each of said hidden ciphertext blocks with a corresponding element of a sequence of unpredictable elements to create a set of output blocks of the ciphertext, wherein a hidden ciphertext block identified by an index i is combined with the element of the sequence identified by index i by an operation that has an inverse.

54. The system as defined in claim 53, wherein said third component for creating a MDC block step comprises:

a component for applying the non-cryptographic MDC function to the partitioned plaintext blocks; and a component for combining the result with a secret, l-bit random vector generated on a per-message basis to obtain said MDC block.

55. A decryption system that is the inverse of the encryption system which provides both data confidentiality and integrity, comprising:

at least one processor, and a memory operatively connected thereto, wherein the at least one processor includes therein, or among them if more than one processor, the following components:

a first component for presenting a string including ciphertext string for decryption;

a second component for partitioning said ciphertext string into a plurality of ciphertext blocks comprising l-bits each;

a third component for selecting n+1 ciphertext blocks from said plurality of ciphertext blocks representing n data blocks and one Manipulation Detection Code (MDC) block and performing a reverse randomization function on each of the selected n+1 ciphertext blocks to obtain a plurality of hidden ciphertext blocks each of l-bits in length;

a fourth component for making one and only one processing pass with a single cryptographic primitive that is the inverse of an encryption single cryptographic primitive over the plurality of hidden ciphertext block to obtain a plurality of plaintext blocks comprising l-bits each;

a fifth component for verifying integrity of the plaintext blocks using a non-cryptographic MDC function; and a sixth component for outputting the plurality of plaintext blocks as an accurate plaintext string if the integrity verification passes; and a seventh component for outputting a failure indicator if the integrity verification fails.

56. The system as defined in claim 55, wherein said third component for performing said reverse randomization function comprises:
- a component for deriving a secret random number from said ciphertext string presented for decryption;
- a component for generating a sequence of unpredictable elements each of l-bit length from said secret random number in the same manner as used at an encryption system;
- a component for selecting n+1 ciphertext blocks from said plurality of ciphertext blocks representing n data blocks and one Manipulation Detection Code (MDC) block in the same order as that used at an encryption system, and combining said selected ciphertext blocks with said sequence of unpredictable elements to obtain a plurality of hidden ciphertext blocks, such that each of the n+1 ciphertext blocks identified by index i is combined with the element of the sequence of unpredictable elements identified by index i, by the inverse of said operation used at the encryption system;
- wherein said fourth component for making one and only one processing pass comprises a component for decrypting the plurality of hidden ciphertext blocks with the inverse of the block cipher used at an encryption system with a first secret key (K), the result of the decryption being a plurality of n decrypted plaintext data blocks and one decrypted MDC block each of l-bit length; and
- wherein said fifth component for verifying integrity step comprises a component for creating an MDC decryption block by applying the non-cryptographic MDC function to the n decrypted plaintext data blocks and combining the result with a secret, l-bit random vector, said combining operation being the same as the combining operation at the encryption system, and said secret random vector being derived from said secret random number in the same manner as at the encryption system; and comparing said created MDC decryption block with the decrypted MDC block.

57. A program product for parallel encryption processing of a message comprising:
at least one computer-readable medium having computer-readable program code embodied therein or among them if more than medium, capable of being executed by a computer, comprising:
first code for partitioning said input plaintext string into a plurality of input plaintext segments;
second code for concurrently presenting each different one of said plurality of input plaintext segments to a different one of a plurality of encryption processors, each of said different processors using a different l-bit secret random number per segment to obtain a ciphertext segment using an encryption code providing both data confidentiality and integrity with a single processing pass over the input plaintext segment and a single cryptographic primitive, and using a non-cryptographic Manipulation Detection Code function, wherein said single cryptographic primitive is a l-bit block cipher using a secret first key;
third code for assembling the plurality of ciphertext segments into a ciphertext string; and
fourth code for outputting the ciphertext string.

58. The program product as defined in claim 57, wherein said third code for assembling comprises code for including in the ciphertext string the number of ciphertext segments, a ciphertext segment index, a length of each ciphertext segment and a sequence of ciphertext segments.

59. A program product for parallel decryption processing of a message comprising:
at least one computer-readable medium having computer-readable program code embodied therein or among them if more than medium, capable of being executed by a computer, comprising:
first code for presenting a string including the ciphertext string of a message for decryption;
second code for partitioning said ciphertext string into a plurality of ciphertext segments;
third code for concurrently presenting said plurality of ciphertext segments to a plurality of processors;
fourth code for obtaining a different secret random number per ciphertext segment from a secret random number in the same manner as at the parallel encryption program product;
fifth code for decrypting each ciphertext segment using said different secret random number per ciphertext segment to obtain a plaintext segment, using a decryption method that is the inverse of an encryption method used in the parallel encryption method that provides both data confidentiality and integrity with a single processing pass over the input plaintext segment and a single cryptographic primitive, wherein said single cryptographic primitive is a l-bit block cipher using a secret first key, and using a non-cryptographic Manipulation Detection Code function for verifying integrity of the plaintext blocks of each plaintext segment;
sixth code for assembling the plurality of plaintext segments into a plaintext string; and
seventh code for verifying the integrity of the plaintext segments and their sequence and outputting the plaintext string if the integrity verification passes.

60. The program product as defined in claim 59, further comprising code for outputting a failure indicator if the integrity verification fails for at least one segment.

61. A system for parallel encryption processing of a message comprising:
at least one processor, and a memory operatively connected thereto, wherein the at least one processor includes therein, or among them if more than one processor, the following components:
a first component for partitioning said input plaintext string into a plurality of input plaintext segments;
a second component for concurrently presenting each different one of said plurality of input plaintext segments to a different one of a plurality of encryption processors, each of said different processors using a different l-bit secret random number per segment to obtain a ciphertext segment using an encryption component providing both data confidentiality and integrity with a single processing pass over the input plaintext segment and a single cryptographic primitive, and using a non-cryptographic Manipulation Detection Code function, wherein said single cryptographic primitive is a l-bit block cipher using a secret first key;
a third component for assembling the plurality of ciphertext segments into a ciphertext string; and
a fourth component for outputting the ciphertext string.

62. The system as defined in claim 61, wherein said third component for assembling comprises a component for including in the ciphertext string the number of ciphertext segments, a ciphertext segment index, a length of each ciphertext segment and a sequence of ciphertext segments.

63. A system for parallel decryption processing of a message comprising:
- at least one processor, and a memory operatively connected thereto, wherein the at least one processor includes therein, or among them if more than one processor, the following components:
- a first component for presenting a string including the ciphertext string of a message for decryption;
- a second component for partitioning said ciphertext string into a plurality of ciphertext segments;
- a third component for concurrently presenting said plurality of ciphertext segments to a plurality of processors;
- a fourth component for obtaining a different secret random number per ciphertext segment from a secret random number in the same manner as at the parallel encryption system;
- a fifth component for decrypting each ciphertext segment using said different secret random number per ciphertext segment to obtain a plaintext segment, using a decryption method that performs the inverse operation of an encryption method used in the parallel encryption method that provides both data confidentiality and integrity with a single processing pass over the input plaintext segment and a single cryptographic primitive, wherein said single cryptographic primitive is a l-bit block cipher using a secret first key, and using a non-cryptographic Manipulation Detection Code function for verifying integrity of the plaintext blocks of each plaintext segment;
- a sixth component for assembling the plurality of plaintext segments into a plaintext string; and
- a seventh component for verifying the integrity of the plaintext segments and their sequence and outputting the plaintext string if the integrity verification passes.

64. The system as defined in claim 63, further comprising a component for outputting a failure indicator if the integrity verification fails for at least one segment.

65. An encryption method for providing both data confidentiality and integrity for a message, comprising the steps of:
- receiving an input plaintext string comprising a message;
- generating a plurality of equal-sized blocks of l-bits in length from the input plaintext string;
- creating a Manipulation Detection Code (MDC) block of l-bits in length that includes the result of applying a non-cryptographic MDC function to the plurality of the equal-sized blocks;
- making one and only one processing pass with a single cryptographic primitive over each of said equal-sized blocks and the MDC block to create a plurality of hidden ciphertext blocks each of l-bits in length; and
- performing a randomization function over said plurality of hidden ciphertext blocks to create a plurality of output ciphertext blocks each of l-bits in length.

66. The method as defined in claim 65,
- wherein said making one and only one processing pass step comprises processing each of said equal-sized blocks and the MDC block by an encryption scheme that is confidentiality-secure against chosen-plaintext attacks, wherein each of said equal-sized blocks and the MDC block is processed by a block cipher using a first secret key to obtain said plurality of hidden ciphertext blocks; and
- wherein said performing a randomization function step comprises combining each of said hidden ciphertext blocks with a corresponding element of a sequence of unpredictable elements to create a set of output blocks of the ciphertext, wherein a hidden ciphertext block identified by an index i is combined with the element of the sequence identified by index i by an operation that has an inverse.

67. The method as defined in claim 65, wherein said generating a plurality of equal-sized blocks of l-bits in length from the input plaintext string further comprises the steps of:
- padding the input plaintext string as necessary such that its length is a multiple of l-bits; and
- partitioning the padded input plaintext string into a plurality of equal-size blocks of l-bits in length.

68. The method as defined in claim 67, wherein said padding of the input plaintext string is a standard padding method.

69. The method as defined in claim 66,
- wherein the result of the combination of any two different unpredictable elements of the sequence of unpredictable elements by the inverse operation of the operation to create a set of output blocks of the ciphertext is unpredictable; and
- wherein said unpredictable elements selected as said two unpredictable elements are any two different elements of the same sequence of unpredictable elements used for the encryption of said plaintext string; and
- wherein said unpredictable elements selected as said two unpredictable elements are any two different elements of a plurality of sequences of unpredictable elements used for encryption of a plurality of plaintext strings with the same secret key K.

70. The method as defined in claim 2,
- wherein the result of the combination of any two different unpredictable elements of the sequence of unpredictable elements by the inverse operation of the operation to create a set of output blocks of the ciphertext is unpredictable; and
- wherein said unpredictable elements selected as said two unpredictable elements are any two different elements of the same sequence of unpredictable elements used for the encryption of said plaintext string; and
- wherein said unpredictable elements selected as said two unpredictable elements are any two different elements of a plurality of sequences of unpredictable elements used for encryption of a plurality of plaintext strings with the same secret key K.

71. A program product for an encryption method for providing both data confidentiality and integrity for a message, including machine-readable code for causing a machine to perform the following method steps at least one computer-readable medium having computer-readable program code embodied therein or among them if more than medium, capable of being executed by a computer, comprising:
- receiving an input plaintext string comprising a message;
- generating a plurality of equal-sized blocks of l-bits in length from the input plaintext string;
- creating a Manipulation Detection Code (MDC) block of l-bits in length that includes the result of applying a non-cryptographic MDC function to the plurality of the equal-sized blocks;
- making one and only one processing pass with a single cryptographic primitive over each of said equal-sized blocks and the MDC block to create a plurality of hidden ciphertext blocks each of l-bits in length; and performing a randomization function over said plurality of hidden ciphertext blocks to create a plurality of output ciphertext blocks each of l-bits in length.

72. The program product defined in claim 71, wherein the program code for causing the performance of the step of making one and only one processing pass step comprises processing each of said equal-sized blocks and the MDC block by an encryption scheme that is confidentiality-secure against chosen-plaintext attacks, wherein each of said equal-sized blocks and the MDC block is processed by a block cipher using a first secret key to obtain said plurality of hidden ciphertext blocks; and wherein the program code for causing the performing a randomization function step comprises combining each of said hidden ciphertext blocks with a corresponding element of a sequence of unpredictable elements to create a set of output blocks of the ciphertext, wherein a hidden ciphertext block identified by an index i is combined with the element of the sequence identified by index i by an operation that has an inverse.

73. The program product defined in claim 71, wherein the program code for performing said step of generating a plurality of equal-sized blocks of l-bits in length from the input plaintext string further comprises code for performing the steps of:

padding the input plaintext string as necessary such that its length is a multiple of l-bits; and partitioning the padded input plaintext string into a plurality of equal-size blocks of l-bits in length.

74. The program product defined in claim 73, wherein the program code for performing said step of padding of the input plaintext string comprises code for performing a standard padding method.

75. The program product defined in claim 72, wherein the result of the combination of any two different unpredictable elements of the sequence of unpredictable elements by the inverse operation of the operation to create a set of output blocks of the ciphertext is unpredictable; and wherein said unpredictable elements selected as said two unpredictable elements are any two different elements of the same sequence of unpredictable elements used for the encryption of said plaintext string; and wherein said unpredictable elements selected as said two unpredictable elements are any two different elements of a plurality of sequences of unpredictable elements used for encryption of a plurality of plaintext strings with the same secret key K.

76. The program product defined in claim 48, wherein the result of the combination of any two different unpredictable elements of the sequence of unpredictable elements by the inverse operation of the operation to create a set of output blocks of the ciphertext is unpredictable; and wherein said unpredictable elements selected as said two unpredictable elements are any two different elements of the same sequence of unpredictable elements used for the encryption of said plaintext string; and wherein said unpredictable elements selected as said two unpredictable elements are any two different elements of a plurality of sequences of unpredictable elements used for encryption of a plurality of plaintext strings with the same secret key K.

77. An encryption system for providing both data confidentiality and integrity for a message, comprising:

at least one processor, and a memory operatively connected thereto, wherein the at least one processor includes therein, or among them if more than one processor, the following components:

a first component for receiving an input plaintext string comprising a message;

a second component for generating a plurality of equal-sized blocks of l-bits in length from the input plaintext string;

a third component for creating a Manipulation Detection Code (MDC) block of l-bits in length that includes the result of applying a non-cryptographic MDC function to the plurality of the equal-sized blocks;

a fourth component for making one and only one processing pass with a single cryptographic primitive over each of said equal-sized blocks and the MDC block to create a plurality of hidden ciphertext blocks each of l-bits in length; and a fifth component for performing a randomization function over said plurality of hidden ciphertext blocks to create a plurality of output ciphertext blocks each of l-bits in length.

78. The system as defined in claim 77, wherein said fourth component for making one and only one processing pass comprises a component for processing each of said equal-size blocks and the MDC block by an encryption scheme that is confidentiality-secure against chosen-plaintext attacks, wherein each of said equal-sized blocks and the MDC block is processed by a block cipher using a first secret key to obtain said plurality of hidden ciphertext blocks; and wherein fifth component for performing a randomization function comprises a component for combining each of said hidden ciphertext blocks with a corresponding element of a sequence of unpredictable elements to create a set of output blocks of the ciphertext, wherein a hidden ciphertext block identified by an index i is combined with the element of the sequence identified by index i by an operation that has an inverse.

79. The system as defined in claim 77, wherein said second component for generating a plurality of equal-sized blocks of l-bits in length from the input plaintext string further comprises components for padding the input plaintext string as necessary such that its length is a multiple of l-bits; and partitioning the padded input plaintext string into a plurality of equal-size blocks of l-bits in length.

80. The system as defined in claim 79, wherein the said component for padding of the input plaintext string comprises a component for a standard padding method.

81. The system as defined in claim 78, wherein the result of the combination of any two different unpredictable elements of the sequence of unpredictable elements by the inverse operation of the operation to create a set of output blocks of the ciphertext is unpredictable; and wherein said unpredictable elements selected as said two unpredictable elements are any two different elements of the same sequence of unpredictable elements used for the encryption of said plaintext string; and wherein said unpredictable elements selected as said two unpredictable elements are any two different elements of a plurality of sequences of unpredictable elements used for encryption of a plurality of plaintext strings with the same secret key K.

82. The system as defined in claim 53, wherein the result of the combination of any two different unpredictable elements of the sequence of unpredictable elements by the inverse operation of the operation to create a set of output blocks of the ciphertext is unpredictable; and wherein said unpredictable elements selected as said two unpredictable elements are any two different elements of the same sequence of unpredictable elements used for the encryption of said plaintext string; and wherein said unpredictable elements selected as said two unpredictable elements are any two different elements of a plurality of sequences of unpredictable elements used for encryption of a plurality of plaintext strings with the same secret key K.

* * * * *